United States Patent
Attarwala et al.

(10) Patent No.: US 6,391,993 B1
(45) Date of Patent: May 21, 2002

(54) HIGH TEMPERATURE, CONTROLLED STRENGTH ANAEROBIC COMPOSITIONS CURABLE UNDER AMBIENT ENVIRONMENTAL CONDITIONS

(75) Inventors: Shabbir Attarwala, Simsbury; Gina M. Mazzella, Middletown; Hsien-Kun Chu, Wethersfield; Dzu D. Luong, West Hartford; Lester D. Bennington, East Hartford; Mark M. Konarski, Old Saybrook; Eerik Maandi, Rocky Hill; Richard D. Rich, Avon; Natalie R. Li, Middletown; Frederick F. Newberth, III, West Hartford; Susan L. Levandoski, Bristol, all of CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/446,492

(22) PCT Filed: Jul. 1, 1998

(86) PCT No.: PCT/US98/13704

§ 371 Date: May 11, 2000

§ 102(e) Date: May 11, 2000

(87) PCT Pub. No.: WO99/01484

PCT Pub. Date: Jan. 14, 1999

Related U.S. Application Data

(63) Continuation of application No. 08/888,002, filed on Jul. 3, 1997, now Pat. No. 6,043,327.
(60) Provisional application No. 60/061,961, filed on Oct. 14, 1997, and provisional application No. 60/089,070, filed on Jun. 12, 1998.

(51) Int. Cl.$^7$ ............................................. C08F 26/06
(52) U.S. Cl. ................................................. 526/261
(58) Field of Search .......................................... 526/261

(56) References Cited

U.S. PATENT DOCUMENTS

| | | | |
|---|---|---|---|
| 2,793,223 A | 5/1957 | Merker | 260/448.2 |
| 2,898,361 A | 8/1959 | Barnes, Jr. | 260/448.2 |
| 2,922,806 A | 1/1960 | Merker | 260/448.2 |
| 2,922,807 A | 1/1960 | Merker | 260/448.2 |
| 3,218,305 A | 11/1965 | Krieble | 260/89.5 |
| 3,794,610 A | 2/1974 | Bachman | 260/31.6 |
| 3,988,299 A | 10/1976 | Malosfsky | 260/47 UA |
| 4,035,355 A | 7/1977 | Baney et al. | 260/46.5 |
| 4,107,109 A | 8/1978 | Kassal | 260/4 R |
| 4,180,640 A | 12/1979 | Melody et al. | 526/323.1 |
| 4,216,134 A | 8/1980 | Brenner | 260/40 R |
| 4,267,330 A | 5/1981 | Kuehne | 546/51 |
| 4,269,953 A | 5/1981 | Brand | 525/534 |
| 4,287,330 A | 9/1981 | Rich | 526/270 |
| 4,302,570 A | 11/1981 | Werber | 526/320 |
| 4,321,349 A | 3/1982 | Rich | 526/270 |
| 4,348,454 A | 9/1982 | Eckberg | 428/334 |
| 4,384,101 A | 5/1983 | Kovacs et al. | 528/73 |
| 4,431,787 A | 2/1984 | Werber | 526/240 |
| 4,524,176 A | 6/1985 | Pike et al. | 525/12 |
| 4,600,738 A | 7/1986 | Lamm et al. | 523/500 |
| 4,624,725 A | 11/1986 | Lamm et al. | 156/310 |
| 4,665,147 A | 5/1987 | Lien et al. | 528/15 |
| 5,179,134 A | 1/1993 | Chu et al. | 522/37 |
| 5,182,315 A | 1/1993 | Chu et al. | 522/37 |
| 5,212,211 A | 5/1993 | Welch, II et al. | 522/37 |
| 5,302,679 A | 4/1994 | Maandi et al. | 526/262 |
| 5,391,593 A | 2/1995 | Inoue et al. | 523/176 |
| 5,567,741 A | 10/1996 | Casey et al. | 521/133 |
| 5,605,999 A | 2/1997 | Chu et al. | 528/24 |

FOREIGN PATENT DOCUMENTS

| | | | |
|---|---|---|---|
| JP | 04 268 315 | 9/1992 | C08F/299/08 |

OTHER PUBLICATIONS

L. J. Baccei and B. M. Malofsky, "Anaerobic Adhesives Containing Maleimides Having Improved Thermal Resistance," *Adhesive Chemicals*, 589–601 m L–H, Lee ed., Plenum Publishing Corp. (1984).

R. H. Baney et al., "Silsesquioxanes," *Chem. Rev.*, 95, 1409–30 (1995).

F. J. Campbell, "Electron Beam Curing Improves High Temperature Strength of Vinyl Ester Adhesives," Nat'l SAMPE Symp. Exh., 59–63 (1977).

R. D. Rich, "Anaerobic Adhesives," in *Handbook of Adhesive Technology*, 29, 467–79, A. Pizzi and K. L. Mittal eds., Marcel Dekker, Inc., NY (1994).

*Primary Examiner*—Peter D. Mulcahy
(74) *Attorney, Agent, or Firm*—Steven C. Bauman

(57) ABSTRACT

The present invention provides anaerobic adhesive compositions, reaction products of which demonstrate controlled-strength at ambient temperature conditions and enhanced resistance to thermal degradation at elevated temperature conditions. The compositions are (meth)acrylate- and/or polyorganosiloxane-based and may include one or more of a variety of other components, such as certain coreactants, a maleimide component, a diluent component reactive at elevated temperature conditions, mono- or polyhydroxyalkane components, and other components.

38 Claims, No Drawings

HIGH TEMPERATURE, CONTROLLED STRENGTH ANAEROBIC COMPOSITIONS CURABLE UNDER AMBIENT ENVIRONMENTAL CONDITIONS

This application is a continuation of U.S. Provisional Application No. 60/061,961, filed Oct. 14, 1997 and No. 60/089,070, Jun. 12, 1998 (each now abandonded), U.S. patent application Ser. No. 08/888,002, filed Jul. 3, 1997 (now U.S. Pat. No. 6,043,327, issued Mar. 28, 2000), and International Patent Application No. PCT/US98/13704, filed Jul. 1, 1998.

BACKGROUND OF THE INVENTION

1. Field of the Invention

The present invention provides anaerobic adhesive compositions, reaction products of which demonstrate controlled-strength at ambient temperature conditions and enhanced resistance to thermal degradation at elevated temperature conditions. The compositions are (meth)acrylate- and/or polyorganosiloxane-based and may include one or more of a variety of other components, such as certain coreactants, a maleimide component, a diluent component reactive at elevated temperature conditions, mono- or poly-hydroxyalkane components, and other components.

2. Brief Description of the Technology

Anaerobic adhesive compositions generally are well-known. See e.g., R. D. Rich, "Anaerobic Adhesives" in *Handbook of Adhesive Technology*, 29, 467–79, A. Pizzi and K. L. Mittal, eds., Marcel Dekker. Inc., New York (1994) and references cited therein. Their uses are legion and new applications continue to be developed.

Anaerobic adhesive compositions may be classified as ones having high strength, medium strength or low strength. Controlling the strength of anaerobic adhesive compositions to render them having medium or low strength has ordinarily been achieved through the inclusion of a plasticizer or non-reactive diluent component into a high strength anaerobic adhesive composition, with the amount of such component influencing the degree of strength of the cured composition. While apparently satisfactory to provide an anaerobic adhesive composition with the properties desired, such an approach typically provides only a temporary solution to an immediate need and does little to advance the knowledge base of controlling the strength of anaerobic adhesive compositions.

Moreover, the inclusion of a non-reactive diluent in a high strength anaerobic adhesive composition by trapping the diluent in the polymeric matrix which forms upon curing, effectively limits the cross-link density which can form in the cured composition. This reduces the overall strength of the cured compositions.

More specifically, in use at ambient temperature conditions, the cured composition retains the non-reactive diluent. However, as the temperature of the environment in which the cured composition increases, the non-reactive diluent either evaporates or otherwise escapes from the polymeric matrix due to its decreased viscosity in view of the increased temperature. In either event, at increased temperatures (e.g., about 250° F. and greater) the so-formed polymeric matrix becomes little more than a shell resulting in virtually no strength retention.

The patent literature points out examples of related anaerobic adhesives:

U.S. Pat. No. 4,107,109 (Kassal) (composition for making graft copolymers under anaerobic conditions at elevated temperatures, including a solution of certain uncured elastomers in a polymerizable vinyl monomer and a thermally activatable modified peroxide initiator, which form a continuous phase with the resulting vinyl polymer forming a separate and discrete phase); U.S. Pat. No. 4,216,134 (Brenner) (one-component anaerobic adhesive compositions which include ethylenically unsaturated diluent monomers, prepolymers and triallyl cyanurate or triallyl isocyanurate as reaction components); U.S. Pat. No. 4,269,953 (Brand) (certain biphenylene additives as reactive plasticizers which are said to render easier working, molding, extruding and the like, of the polymer and react to cross link certain aromatic thermoplastic polymers); U.S. Pat. No. 4,302,570 (Werber) (the purported use of reactive non-terminal hydroxydiesters of unsaturated organic dicarboxylic acids or anhydrides as plasticizers for anaerobic adhesives); U.S. Pat. No. 4,384, 101 (Kovacs) (thermosetting resin mixtures which contain epoxide components, isocyanate components, latent-hardening components and triallyl cyanurate as a cross-linking compound); U.S. Pat. No. 4,431,787 (Werber) (polymerizable acrylic monomers, depicted with internal chain unsaturation as well as acrylic unsaturation, which cross-polymerize through the sites of internal chain unsaturation to furnish the reaction product); U.S. Pat. No. 4,524,176 (Pike) (anaerobic adhesive which includes the reaction product of an hydroxyl-containing polyester and a glycidyl acrylate) and the addition of a modifier—i.e., triallyl cyanurate—to alter flexibility and bond strength of the cured adhesive); U.S. Pat. No. 4,600,738 (Lamm) and U.S. Pat. No. 4,624,725 (Lamm) (two-component acrylic modified polyester adhesives of (a) the acrylic modified polyester reaction product of a glycidyl acrylate and a hydroxyl containing polyester and (b) an organometallic acid salt containing a polymerizable monomer).

Also of interest are:

U.S. Pat. No. 5,567,741 (Casey) (in the context of foaming applications, acrylate anaerobic compositions, certain of which include ethylene glycol); U.S. Pat. No. 3,794,610 (Bachmann) (plasticized anaerobic compositions including a polymerizable acrylate ester monomer (a non-silicone based acrylate monomer), a peroxy polymerization initiator and a polymeric plasticizer); U.S. Pat. No. 4,267,330 (Rich) (certain diaza accelerators for curable adhesive and sealant compositions); U.S. Pat. No. 3,988,299 (Malofsky) (heat curable composition having improved thermal properties, which includes certain acrylate monomers and maleimide compounds); and U.S. Pat. No. 5,302,679 (Maandi) (anaerobic compositions which expand when post cured).

In addition, L. J. Baccei and B. M. Malofsky, "Anaerobic Adhesives Containing Maleimides Having Improved Thermal Resistance" in *Adhesive Chemicals*, 589–601, L-H, Lee, ed., Plenum Publishing Corp. (1984) reports the use of maleimides—specifically, N-phenyl maleimide, m-phenylene dimaleimide and a reaction product of methylene dianiline and methylene dianiline bismaleimide—to increase the thermal resistance of anaerobic adhesives which are fully cured at temperatures of at least 150° C.

And, F. J. Campbell, "Electron Beam Curing Improves High Temperature Strength of Vinyl Ester Adhesives", Nat'l SAMPE Symp. Exh., 59–63 (1977) speaks to radiation curing of acrylic-modified epoxies together in formulations with vinyl functional monomers (i.e., divinyl benzene, trialkyl cyanurate and styrene) to form cured resins of higher level (cross-linking and superior ambient and elevated temperature performance.

Silicones (or polyorganosiloxanes), because of their excellent thermal stability, have been used for many sealant, adhesive and coating applications. However, because of large amounts of dissolved oxygen and high permeability to oxygen, conventional wisdom generally believed until recently that silicones would not be anaerobically curable.

For instance, U.S. Pat. No. 4,035,355 (Baney) teaches anaerobically curing sealant compositions of acrylate-containing polyorganosiloxanes and a hydroperoxy polymerization initiator. These compositions require relatively long cure times—i.e., about 24 hours—and therefore would have limited commercial acceptance.

U.S. Pat. No. 5,391,593 (Inoue) is directed to a silicone rubber sealant composition of an organopolysiloxane, organic peroxide and carbon black which is said to cure under anaerobic conditions into silicone rubber having improved physical properties. These silicones require about 2 to 3 days after removal of oxygen to fully cure. Such a cure profile again would meet with poor commercial acceptance.

Japanese Patent Document JP 04-268,315 appears to be directed to an anaerobically and ultraviolet curable polyorganosiloxane composition for adhesive purposes that is reported to have good heat resistance.

Recently, Loctite Corporation made an advance in the field of anaerobically-curable silicone formulations by teaching an anaerobic composition including (a) a silicone fluid formed as the reaction product of a first silane having at least one hydrolyzable functional group, and a second silane having a (meth)acrylic functional group and at least one hydrolyzable functional group; (b) a (meth)acrylate monomer; and (c) polymerization initiator. See U.S. Pat. No. 5,605,999 (Chu). These anaerobically-curable silicone formulations are referred to herein as "SiMA".

While appealing for many commercial applications, certain other commercial applications requiring enhanced resistance to thermal degradation at elevated temperature conditions—such as, machinery operations or operations which ordinarily occur at elevated temperature conditions, for instance, oil field applications or applications in electric motors—, may be better served by a composition demonstrating a resistance and degradation profile more precisely tailored to that application.

Accordingly, it would be desirable to provide an anaerobically curing silicone composition, which cures in a short period of time without sacrificing heat stability and strength properties of the cured resin, and which demonstrates enhanced resistance to thermal degradation at elevated temperature conditions. It would further be desirable to be able to control the strength of the cured resin while maintaining high temperature resistance.

Notwithstanding the state-of-the-technology, a one-part, anaerobic adhesive composition would be desirable which is capable of curing under ambient environmental conditions, and which, when cured into reaction products, demonstrates superior properties, such as controlled strength and superior resistance to thermal degradation at elevated temperatures.

SUMMARY OF THE INVENTION

The present invention meets the desires discussed above by providing methods of controlling the strength of high temperature resistant anaerobic adhesives through the use of certain additives. That is, the present invention provides anaerobic adhesive compositions, reaction products of which demonstrate controlled strength at ambient temperature conditions and enhanced resistance to thermal degradation at elevated temperature conditions.

In one aspect of the invention, the compositions include (a) a (meth)acrylate component; (b) a coreactant; and (c) an anaerobic cure-inducing component. Such compositions may also include (d) a maleimide component.

In another aspect of the present invention, the compositions include (a) a (meth)acrylate component; (b) a maleimide component; (c) a diluent component reactive at elevated temperature conditions; and (d) an anaerobic cure-inducing component. Such compositions may also include a mono- or poly-hydroxyalkane component, a polymeric plasticizer component, and/or a chelator.

In yet another aspect of the invention, the compositions include: (a) a SiMA; (b) a (meth)acrylate component; (c) a maleimide component; and (d) an anaerobic cure-inducing component.

In this aspect of the invention, such compositions may also include alternatively, or in addition, to the maleimide component, a mono- or poly-hydroxyalkane component, a polymeric plasticizer component, and/or a chelator.

In still another aspect of the invention, the compositions include: (a) SiMA; (b) a (meth)acrylate component; (c) a mono- or poly-hydroxyalkane component; and (d) an anaerobic cure-inducing composition.

In yet still another aspect of the invention, the compositions include: (a) a SiMA; (b) a polymeric plasticizer component; and (c) an anaerobic cure-inducing component.

In this aspect of the invention, such compositions may also include a (meth)acrylate component, a mono- or poly-hydroxyalkane component, and/or a chelator.

The invention also provides a process for preparing reaction products from the anaerobic adhesive compositions of the various aspects of the present invention, the steps of which include applying the composition to a desired substrate surface and exposing the coated substrate surface to conditions which are appropriate to effect cure thereof—e.g., exposure to conditions in which air is substantially excluded therefrom.

Also, the invention of course provides the reaction products so-formed by the above-described process, which reaction products demonstrate superior thermal properties such as resistance to degradation at elevated temperatures.

The present invention will be more fully appreciated by a reading of the detailed description and the illustrative examples which follow thereafter.

DETAILED DESCRIPTION OF THE INVENTION

As noted above, the present invention is directed to anaerobic adhesive compositions which are based on a (meth)acrylate component and/or SiMA component, together with an anaerobic cure-inducing composition.

The (meth)acrylate monomer suitable for use in the present invention may be chosen from a wide variety of materials represented by $H_2C=CGCO_2R^1$, where G may be hydrogen, halogen or alkyl of 1 to about 4 carbon atoms, and $R^1$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like.

(Meth)acrylate monomers suitable for use herein include polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate, diethylene glycol di(meth)acrylate, triethylene glycol di(meth)acrylate ("TRIEGMA"), tetraethylene glycol di(meth)acrylate, dipropylene glycol di(meth)acrylate, di-(pentamethylene glycol) di(meth)acrylate, tetraethylene diglycol di(meth) acrylate, diglycerol tetra(meth)acrylate, tetramethylene di(meth)acrylate, ethylene dimethacrylate, neopentyl glycol diacrylate, trimethylol propane triacrylate and bisphenol-A di(meth)acrylates, such as ethoxylated bisphenol-A (meth) acrylate ("EPIBMA").

More specific (meth)acrylate monomers particularly desirable for use herein include polyethylene glycol di(meth)acrylates, bisphenol-A di(meth)acrylates, such as EBIPMA and tetrahydrofuran (meth)acrylates and di(meth) acrylates, hydroxypropyl (meth)acrylate, hexanediol di(meth)acrylate, trimethylol propane tri(meth)acrylate, a (meth)acrylate ester corresponding to the structure as shown below:

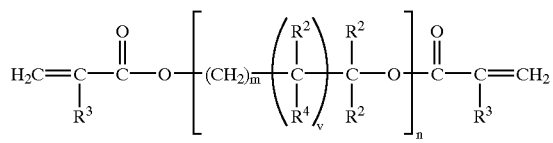

where $R^2$ may be selected from hydrogen, alkyl of 1 to about 4 carbon atoms, hydroxyalkyl of 1 to about 4 carbon atoms or

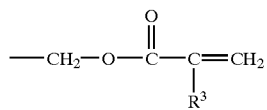

$R^3$ may be selected from hydrogen, halogen, and alkyl of 1 to about 4 carbon atoms;

$R^4$ may be selected from hydrogen, hydroxy and

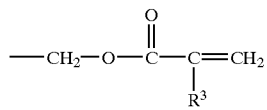

m is an integer equal to at least 1, e.g., from 1 to about 8 or higher, for instance, from 1 to about 4;

n is an integer equal to at least 1, e.g., 1 to about 20 or more; and v is 0 or 1.

Of course, combinations of these (meth)acrylate monomers may also be used.

When used, the (meth)acrylate monomer should be present in the compositions within the range of from about 1 percent by weight to about 60 percent by weight, desirably from about 5 percent by weight to about 50 percent by weight, such as from about 10 percent by weight to about 40 percent by weight, based on the total composition.

SiMA, such as taught by and claimed in U.S. Pat. No. 5,605,999 (Chu), the disclosure of which is hereby expressly incorporated herein by reference, may be used instead of or in addition to the (meth)acrylate monomer as the anaerobically curing resin. That is, such silicone fluids may be formed as reaction products of (a) a silane material within the formula $R_nSi(X)_{4-n}$, where R is H, $C_{1-12}$ alkyl, $C_{6-12}$ aryl, $C_{7-18}$ arylalkyl, $C_{7-18}$ alkylaryl and derivatives thereof, and monovalent ethylenically unsaturated radicals, X is a hydrolyzable functionality and n is an integer from 0 to 3, and (b) a silane material within the formula $R'_mR_pSi(X)_{4-(m+p)}$, where R' is a (meth)acrylic functional group, R and X are as above, and m is an integer from 1 to 3 and m+p is an integer from 1 to 3. Certain of these moieties ordinarily may be reaction products of halogenated trialkyl silanes, tetraalkoxysilanes and (meth)acrylic-subtituted trialkoxysilanes.

In the reaction forming SiMA, the first silane should be used in an amount with the range of from about 1 to about 99 mole %, desirably from about 30 to about 90 mole %, such as from about 50 to about 85 mole % of the combination of the first and second silanes. The second silane should be used in an amount with the range of from about 1 to about 99 mole %, desirably from about 15 to about 70 mole %, such as from about 20 to about 50 mole % of the combination of the first and the second silanes. Often, third and fourth silanes are used to prepare SiMA.

In the compositions of the present invention, the hydrolyzable functionality in either or both of the first silane or the second silane may be any functionality which, when attached to a silicon atom through a Si—O, Si-halo, Si—N or Si—S bond, is readily hydrolyzable in the presence of water. Examples of such functionalities include, but are not limited to, halogen, (meth)acryloxy, alkoxy, aryloxy, isocyanato, amino, acetoxy, oximinoxy, aminoxy, amidato and alkenyloxy.

In the compositions of the present invention, R may be chosen from $C_1–C_{12}$ alkyl and $C_6–C_{12}$ aryl. In such instances when R is $C_1–C_{12}$ alkyl or $C_6–C_{12}$ aryl, examples of the first silane include, but are not limited to, dimethylchlorosilane, phenyltrichlorosilane, tetrachlorosilane, trimethylchlorosilane, trimethylmethoxysilane, dimethyldimethoxysilane, phenyltrimethoxysilane and tetraethoxysilane.

When $R^2$ on the second silane is chosen from $C_1–C_{12}$ alkyl, $C_6–C_{12}$ aryl, alkenyl, (meth)acryloxy and vinyl, the second silane itself may be (meth)acryloxypropyl trimethoxysilane, (meth)acryloxypropyl trichlorosilane, (meth)acryloxypropyl dimethylchloro silane, (meth) acryloxymethyl dichlorosilane and (meth) acryloxymethyldimethyl acryloxysilane.

The second silane component may ordinarily be obtained commercially or prepared by methods well-known in field of methacrylate-functionalized silanes. Examples of such methods may be found in U.S. Pat. No. 2,793,223 (Merker); U.S. Pat. No. 2,898,361 (Barnes, Jr.); U.S. Pat. No. 2,922,806 (Merker); U.S. Pat. No. 2,922,807 (Merker); U.S. Pat. No. 4,348,454 (Eckberg); U.S. Pat. No. 4,665,147 (Lien); U.S. Pat. No. 5,179,134 (Chu); U.S. Pat. No. 5,182,315 (Chu); and 5,212,211 (Welch, II), the disclosures of each of which are hereby expressly incorporated herein by reference.

Of course, appropriate combinations of first silanes may be used as the first silane component; likewise appropriate combinations of second silanes may be used as the second silane component.

When present, the SiMA (a) should be present in the composition in an amount within the range of from about 40 to about 95 percent by weight of the composition, and desirably from about 50 to about 90 percent by weight of the composition, such as from about 60 to about 85 percent by weight of the composition.

The anaerobic cure-inducing composition useful in the present invention includes a variety of components, such as amines (including amine oxides, sulfonamides and triazines). A desirable composition to induce cure in accordance with the present invention includes saccharin, toluidines, such as N,N-diethyl-p-toluidine and N,N-dimethyl-o-toluidine, acetyl phenylhydrazine, and maleic acid. Of course, other materials known to induce anaerobic cure may also be included or substituted therefor. See e.g., Loctite U.S. Pat. No. 3,218,305 (Krieble), U.S. Pat. No. 4,180,640 (Melody), U.S. Pat. No. 4,287,330 (Rich) and U.S. Pat. No. 4,321,349 (Rich). Quinones, such as napthoquinone and anthraquinone, may also be included to scavenge free radicals which form.

In one aspect of the invention, the compositions further include a certain coreactant. These compositions may also include a maleimide component.

When used, the coreactant may be selected from monomers within structures I and II, which are represented as:

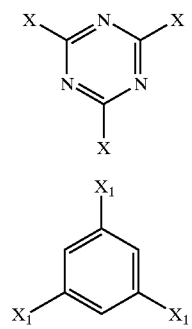

I

II where X is present at least once on structure I (i.e., mono-, di- or tri-substituted) and itself may be chosen from H or DA, where D is attached to the ring and may be chosen from O, S or NH, and A is attached to D and is represented by structure III below:

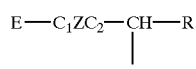

III where Z represents a point of unsaturation, such as (a) a double bond with a second H being attached to $C_1$ and an H or halogen being attached to $C_2$, or (b) a triple bond;

E may be H; and alkyl, alkenyl, alkynyl, alkoxy, each of which may be linear, branched or cyclic, and aryl groups, having from 1 to about 20 carbon atoms, with or without substitution by halogen, silicon, hydroxy, nitrile, ester, amide or sulfate, provided that additional point(s) of unsaturation or heteroatoms, if any, in the groups represented by R (described below) are not alpha to Z; and R may be H; and alkyl, alkenyl, alkynyl, alkoxy, each of which may be linear, branched or cyclic, and aryl groups, having from 1 to about 20 carbon atoms, with or without substitution by halogen, silicon, hydroxy, nitrile, ester, amide or sulfate; and $X_1$ is present at least once on structure II (i.e., mono-, di- or tri-substituted) and itself may be chosed from H or

where D and A are as defined above.

More specific examples of structures I and II, therefore, include structures III and IV, respectively, as depicted below:

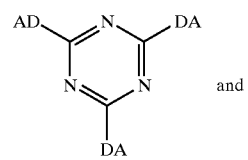

III and

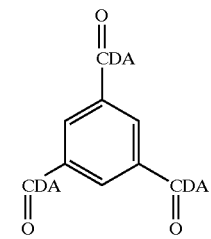

IV

With respect to structure V below, D and A are present at least once and are also present together attached to ring atoms which are in alpha-beta relation to one another, as is depicted in the structure

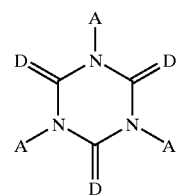

V

Of the coreactants represented above, particularly desirable ones are represented below by structures VI [triallyl cyanurate ("TAC")], VII [triallyl trimesate ("TAT")], and VIII [triallyl isocyanurate ("TAI")] as follows:

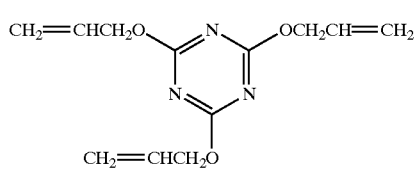

VI

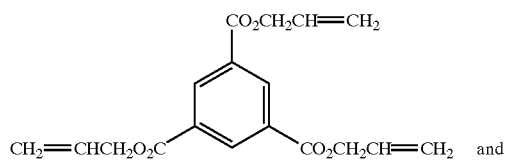

VII and

-continued

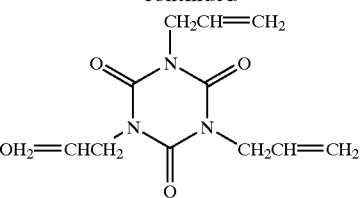

VIII

In addition, the coreactant may be a polymerizable substituted phenolic material, such as materials within structure IX as represented below:

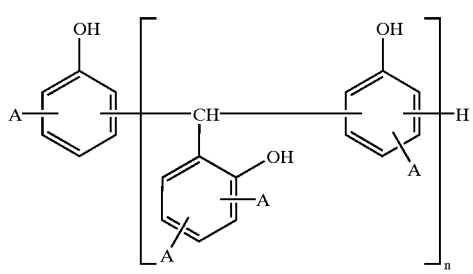

IX where A is as defined above and n is from 0 to about 5.

A particularly desirable choice of coreactant within structure IX is represented below by structure X:

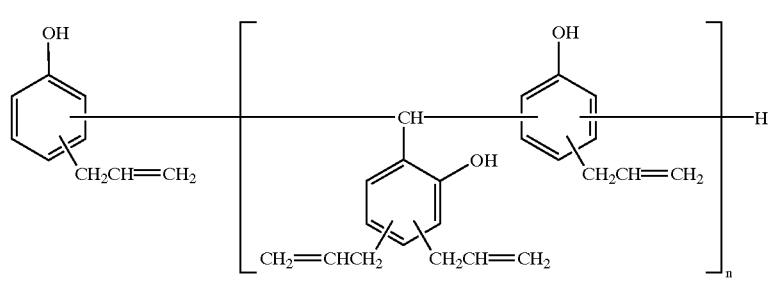

X where n is from 0 to about 5 and which is commercially available under the trade designation "THERMAX" SH-150AR from Mitsubishi Petrochemical Co., Ltd., New York, N.Y.

Other coreactants suitable for use herein include those within structures XI and XII, as shown below.

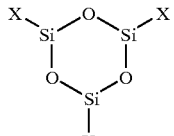

XI

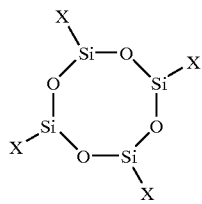

XII where X is as recited above.

Of course, appropriate combinations of these coreactants may also be employed herein.

When used, the coreactant should be present in an amount within the range of about 1 to about 30 percent by weight, based on the total weight of the composition.

Many maleimide compounds are suitable for use herein as the maleimide component.

The maleimide component may include any maleimide which remains substantially unreacted at ambient temperature, but becomes reactive at increased temperatures approaching about 325° F. and greater. Accordingly, many maleimide compounds are suitable for use herein as the maleimide component.

Generally, maleimides which are useful herein conform to the following structures:

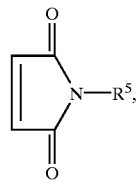

XIII

-continued

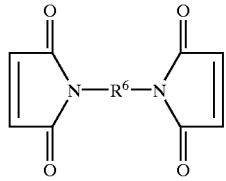

XIV

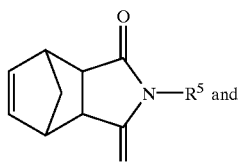

XV

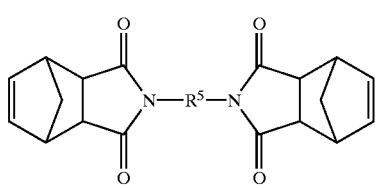

XVI where $R^5$ and $R^6$ are selected from alkyl, aryl [such as phenyl (mono and polyphenyl) and derivatives thereof, such as nitro, hydroxyl, alkyl and the like], cycloalkyl, aralkyl and alkaryl groups, which should ordinarily contain from about 6 to about 100 carbon atoms, with about 6 to about 50 carbon atoms being desirable, any of which may be optionally substituted or interrupted as the case may be with silane, silicone, oxygen, halogen, carbonyl, hydroxyl, ester, carboxylic acid, urea, urethane, carbamate, sulfur, sulfonate, sulfone and the like. For instance, $R^6$ may represent groups such as

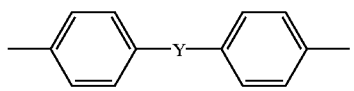

where the phenyl groups are substituted at one or more positions with linear, branched or cyclic alkyl, alkenyl, alkynyl, alkoxy, or aryl groups having from 1 to about 20 carbon atoms, with or without substitution by halogen, hydroxy, nitrile, ester, amide or sulfate; and Y may represent O, S, carbonyl, sulfone, or primary or secondary methylene groups substituted with linear, branched or cyclic alkyl, alkenyl, alkynyl, alkoxy, or aryl groups having from 1 to about 20 carbon atoms, with or without substitution by halogen, hydroxy, nitrile, ester, amide or sulfate.

Desirable maleimides include compounds within structures XIII and XIV shown below as structures XVII [N-phenyl maleimide ("NPM")], XX [N,N'-m-phenylene bismaleimide ("HVA-2", commercially available from E. I. DuPont Chemical Co., Wilmington, Delaware)], XIX [N,N'-(4,4'-methylene diphenylene)bismaleimide ("BMI-30")], XX [N,N'-(2,2'-diethyl-6,6'-dimethyl-4,4'-methylene diphenylene) bismaleimide ("BMI-70" or "MB-7000", commercially available under the "THERMAX" tradename from Mitsubishi Petrochemical Co., K-I Chemical Industry Co., Ltd., Tokyo, Japan)], XXI [2,2'-bis[4-(4'-maleimidediphenoxy)pheny]propane ("MB-8000", commercially available under the "THERMAX" tradename from Mitsubishi), and XXII [multi-functional maleimide prepared as a condensate of aniline, o-toluidine and terephthaldehyde with maleic anhydride, ("MP-2000X"), commercially available under the "THERMAX" tradename from Mitsubishi]:

XVII

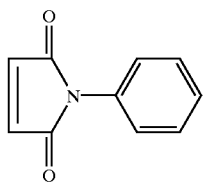

XVIII

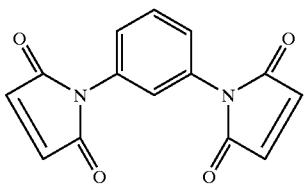

XIX

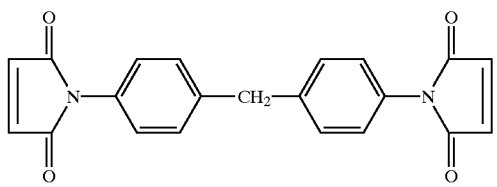

XX

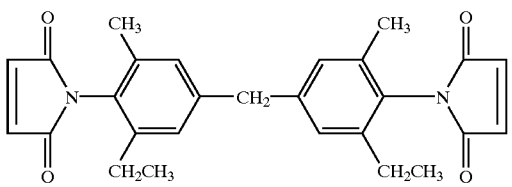

XXI

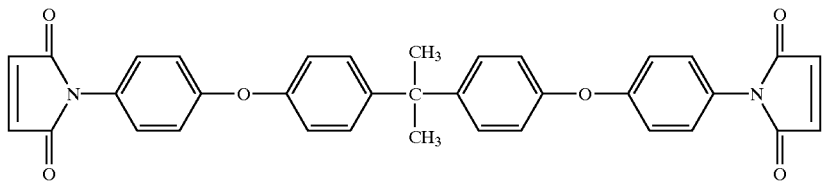

XXII

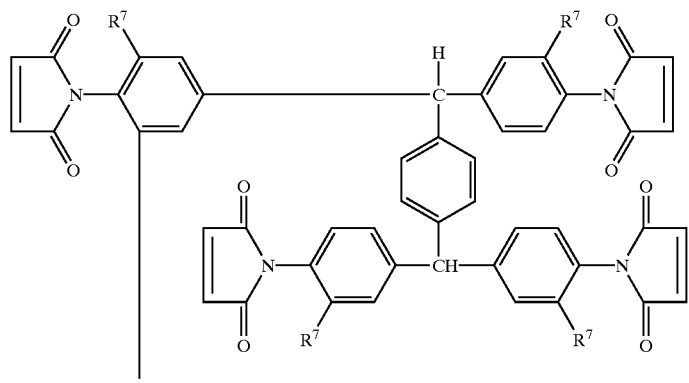

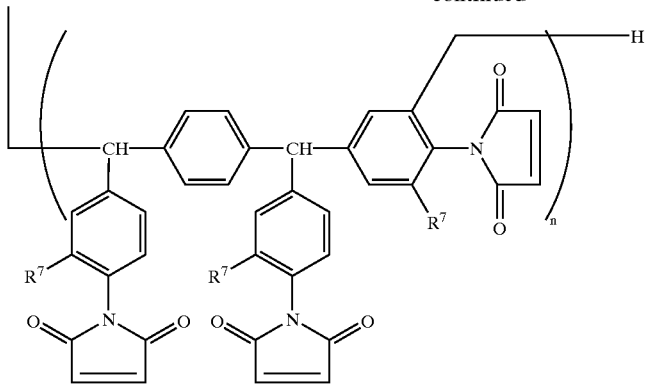

where $R^7$ may be selected from H or alkyl (such as $CH_3$), and n is an integer within the range of 1 to about 10.

The maleimide component should be present in the composition in an amount within the range of from about 5% to about 20%, based on the total weight of the composition.

The compositions may also include a diluent component reactive at elevated temperature conditions.

Reactive diluents include those materials which are particularly (1) unreactive at ambient temperature conditions and (2) reactive at elevated temperature conditions. In addition, such diluents should be capable of not only reacting with other components of the inventive adhesive compositions, but also with reactive moities on itself. This feature allows the diluent to self-polymerize as well as polymerize with reactive moities on the other components of the composition. As such, the reactive diluent becomes incorporated into the polymeric matrix which forms at ambient temperature and which further forms at increased temperatures. The incorporation of the reactive diluent provides at least in part for the high temperature performance demonstrated by the cured composition.

More specific examples of such reactive diluents include alkenyl- or alkynyl-terminated silicone fluids, such as vinyl- or allyl-terminated silicone fluids, an example of which is vinyl-terminated polydimethyl siloxane.

Other examples of reactive diluents based on silicone fluids include alkenyl- or alkynyl-terminated MQ resins. MQ resins are a family of silicone-based materials with a structure represented generally by $(R_3SiO_{1/2})_x(SiO_{4/2})_y$. Ordinarily, the ratio of x to y is in the range of about 0.5 to about 1.0 and R is alkyl, such as methyl; however, a portion of the total R content may also include hydrogen, other alkyl, alkenyl, alkynyl, aryl or derivatives thereof. Where a portion of a the total R content includes vinyl, functionality in the form of vinyl-dimethyl-$SiO_{1/2}$, vinyl-methyl-$SiO_{2/2}$ and/or vinyl-$SiO_{3/2}$ may be present, and the resulting resin is termed by the art skilled as a vinyl-MQ resin.

Vinyl-MQ resins may ordinarily be prepared by (1) acidifying water-soluble sodium silicate, and thereafter capping the resulting sol with a trimethylsilyl group as well as with vinyl-containing silane or (2) co-hydrolyzing and/or co-condensing silanes containing trimethylsilane groups, vinyl silane groups and tetraoxysilane. For a further discussion of commercial silicone resins of this type, see R. H. Blaney et al., "Sisesquioxanes", *Chem. Rev.*, 95, 1409–30 (1995).

Still other examples of the reactive diluent include alkenyl-terminated cyclosiloxanes, such as vinyl- or allyl-terminated cyclosiloxanes, desirably 2,4,6-trimethyl-2,4,6-trivinyl-cyclotrisiloxane ("vinyl-D3") or 2,4,6,8-tetramethyl-2,4,6,8-tetravinyl-cyclotetrasiloxane ("vinyl-D4"). In addition, alkynyl-terminated cyclosiloxanes may also be used herein.

And of course appropriate combinations of such reactive diluents may be used.

When used, the reactive diluent should be employed in an amount within the range of about 1 to about 50 percent by weight, based on the total weight of the composition.

The compositions may also include a mono- or poly-hydroxyalkane component.

The mono- or poly-hydroxyalkanes include alkylene glycols, like ethylene glycol, propylene glycols and propane triols, butane glycols and butane triols, butane tetraols, butylene pentaols and the like, pentylene glycols and pentane triols, pentane tetraols, pentane pentaols, pentane hexaols and the like, hexylene glycols and hexane triols, hexane tetraols, hexane tetraols, hexane pentaols, hexane hexaols, hexane heptaols and the like, and combinations thereof, may be used, as noted above. Such hydroxyalkanes tend to increase the cure speed, improve the shelf-life stability and improve the surface insensitivity (i.e., improve the bonding strength on oiled and/or slow curing substrates, such as zinc substrates) of anaerobic formulations in which they are placed, and decrease the break strength of reaction products of such formulations without compromising the prevailing torque thereof.

When used, the mono- or poly-hydroxyalkanes should be employed in an amount within the range of from about 0.01 to about 10 percent by weight, based on the total weight of the composition.

In certain other compositions of this invention, a polymeric plasticizer component may also be in included. The polymeric plasticizer should aid in bond formation and bond strength on insensitive, unreactive and slow-to-cure metal substrate surfaces, such as zinc and re-oiled surfaces.

The plasticizer component may be chosen from a wide variety of plasticizers depending on the desired properties of the composition and/or reaction product thereof. See e.g., U.S. Pat. No. 3,794,610 (Bachmann), the disclosure of which is hereby expressly incorporated herein by reference.

A particularly desirable plasticizer for use herein is a polymeric plasticizer, such as one available commercially under the tradename "UNIFLEX" 300 from Unicamp Corporation, Jacksonville, Fla. "UNIFLEX" 300 is a medium molecular weight polymeric plasticizer (made from hexanedioic acid and polymer with 1,4-butane diol and 1,2-propane diol), which is liquid at 25° C. whose viscosity at that temperature is 3300 cps. This polymeric plasticizer is reported to be resistant to high temperatures.

When the compositions are to be applied on zinc, stainless steel or re-oiled substrates, a poly(ethylene glycol)

monooleate, such as poly(ethylene glycol) 200 monooleate, may be used in this regard as well.

When used in the inventive compositions, a high strength formulation results which is particularly well-suited for use as a sealant.

When present, such plasticizers may ordinarily be used in the compositions in an amount within the range of from about 1 to about 20 percent by weight, such as about 1 to about 6 percent by weight, based on the total weight of the composition.

A chelator is ordinarily included in an amount sufficient to control shelf-life stability of the composition.

Appropriate chelators may be chosen from a variety of materials, such as ehtylenediamine tetraacetic acid ("EDTA") and diethylene triamine pentaacetic acid pentasodium salt ("DTPA").

Chelators are ordinarily used in the compositions in an amount from about 0.001 percent by weight to about 0.06 percent by weight, based on the total weight of the composition.

The inventive compositions may also include other components, such as free radical initiators, free radical accelerators, inhibitors of free radical generation, as well as metal catalysts.

A number of well-known initiators of free radical polymerization may be incorporated into compositions of the present invention including, without limitation, hydroperoxides, such as cumene hydroperoxide ("CHP"), para-menthane hydroperoxide, t-butyl hydroperoxide ("TBH") and t-butyl perbenzoate.

Such peroxide compounds may be employed in the present invention in the range of from about 0.1 to about 10 percent by weight of the total composition, with about 0.5 to about 5 percent by weight being desirable.

Stabilizers and inhibitors (such as phenols including hydroquinone and quinones) may also be employed to control and prevent premature peroxide decomposition and polymerization of the composition of the present invention.

Accelerators may be employed to enhance the rate of cure propagation, such as in amounts in the range of about 0.1 to about 5, such as about 1 to about 3, percent by weight of the total composition. When the accelerator is in the form of a metal catalyst solution or a pre-mix, it may be used in an amount in the range of about 0.03 to about 0.1% by weight of the total composition. Other agents such as thickeners, plasticizers, fillers, and other well-known additives may be incorporated in the inventive composition where the art-skilled person believes it would be desirable to do so.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, aluminum, zinc and other metals and alloys, ceramics and thermosets.

The compositions of this invention may also be used to impregnate the pores of substrates constructed from such materials.

Such uses of anaerobic compositions generally as impregnant sealants is well-known. Indeed, Loctite Corporation has for many years sold impregnant sealants under the trademark "RESINOL", such as "RESINOL RTC" and "RESINOL 90C".

The inventive compositions, when used as impregnant sealants, may be formulated to have high temperature resistance when cured or low viscosity so as to be curable more quickly and to have enhanced shelf-life stability over existing commercial impregnant sealants.

For those impregnant sealants to be used in high temperature applications, a coreactant (such as TAC or TAI) should be present in an amount within the range of about 20 to about 30 weight percent.

For those lower viscosity impregnant sealants formulated for faster cure speed and enhanced shelf-life stability, a mono- or poly-hydroxyalkane component should be present in an amount within the range of about 1 to about 10 weight percent.

In addition to imparting lower viscosity, faster cure speeds and enhanced sealant formulations, the use of mono- or poly-hydroyalkanes as a component of impregnant sealants aids in the aqueous wash out of uncured compositions from the porous part to be sealed.

The compositions of this invention cure as their name connotes under anaerobic conditions. Nevertheless, other cure modalities may also be employed, if desired, provided of course appropriate choices are made for the components of the inventive compositions to render them curable under the desired conditions. For instance, see the '305, '640, '330 and '349 patents.

As with other anaerobic adhesives, the compositions of the present invention are capable of curing in the substantial absence of air. However, unlike some anaerobic adhesive compositions, the compositions of this invention are capable of curing to form a reaction product at ambient environmental conditions, i.e., at room temperature, instead of requiring elevated temperatures. The requirement of elevated temperatures for curing such adhesives increases manufacturing costs due at least in part to increased energy consumption. The so-formed reaction product forms an acceptable bond without requiring a second part primer material, such as is described in the '738 and '725 patents supra. Thus, the inventive compositions are one-part compositions. And the requirement of a second part primer to form an acceptable bond adhesive increases manufacturing costs due at least in part to the required additional material and is also disadvantageous at least in part with respect to lacking the convenience of a one part system.

The invention also provides a process for preparing a reaction product from the anaerobic adhesive composition of the present invention, the steps of which include applying the composition to a desired substrate surface and excluding air from the environment in which the substrate is positiond.

In another aspect of this invention, there is provided a method of producing anaerobically curing SiMA-containing compositions.

Initially, when SiMA is to be present in the inventive compositions, the following method represents a method for its preparation. The method of preparing SiMA includes the step of allowing at least one first silane to react with at least one second silane in the presence an effective amount of water to hydrolyze hydrolyzable groups on the first and second silanes, thereby producing a silicone fluid. The first silane is within the formula, $R_n Si(X)_{4-n}$, where the R groups may be the same or different and selected from hydrogen, $C_1$–$C_{12}$ alkyl, $C_6$–$C_{12}$ aryl, $C_7$–$C_{18}$ arylalkyl, $C_7$–$C_{18}$ alkylaryl and monovalent ethylenically unsaturated radicals excluding (meth)acryloxy functional groups, X is a hydrolyzable functionality, and n is an integer of from 0 to 3. The second silane is within the formula, $R^1{}_n R^2{}_m Si(X)_{4-(m+n)}$, where $R^1$ is a (meth)acryloxy functional group and $R^2$ is selected from monovalent ethylenically unsaturated radicals, hydrogen, $C_1$–$C_{12}$ alkyl, $C_6$–$C_{12}$ aryl, $C_7$–$C_{18}$ arylalkyl, and $C_7$–$C_{18}$, alkylaryl, X is a hydrolyzable functionality, m is an integer from 1 to 3, and m+p is an integer from 1 to 3.

At ambient temperature and in the presence of oxygen, additional components are next added. For instance, the (meth)acrylate component, maleimide component and an anaerobic cure-inducing component (and if desired any of the other components noted above) are thereafter added to SiMA, thereby producing an anaerobically curable composition in accordance with this invention, which when cured demonstrates high strength and resistance to thermal degradation at elevated temperatures.

The composition may be positioned onto, and in contact with, the surfaces by any suitable means such as spreading or dipping and the surfaces then brought into close proximity. Any solvent which may be present should be allowed to evaporate before the surfaces are brought into close proximity. Alternately, when the composition shows sufficient fluidity, the surfaces can be brought into close proximity and the composition subsequently positioned, e.g., by capillary action, into the small volume between, and in contact with, the surface. The composition however positioned and enclosed by the surface, being effectively excluded from oxygen, cures to an insoluble solid and adheres to the surface, thereby providing an assembly with two or more surfaces held in a fixed relative configuration.

In view of the above description of the present invention, it is clear that a wide range of practical opportunities is provided.

The following examples are provided to further illustrate the present invention. Many other practical opportunities exist with respect to the teaching herein, which will become readily apparent to those persons of skill in the art upon a review of the examples.

EXAMPLES

I. Formulation of Controlled Strength Anaerobic Adhesive Compositions

Sixteen (meth)acrylate-based formulations were prepared, where the (meth)acrylate component included various combinations of SiMA, HPMA and EBIPMA. More specifically, Sample Nos. 1–8 included about 15% by weight of HVA-2 as such a maleimide component and Sample Nos. 9–16 were formulated without any such maleimide component. Whereas Sample Nos. 1–4 and 9–12 were formulated with vinyl-terminated polydimethylsiloxane as a reactive diluent component, Sample Nos. 5–8 and 13–16 were formulated with poly(ethylene glycol) (200) monooleate as a non-reactive diluent component. Whether the diluent component was of the reactive-type in accordance with this invention or of the non-reactive type, amounts of 5, 10, 20 or 30% by weight were chosen for formulation purposes.

For each of the samples, about 4.78% by weight of an anaerobic cure-inducing composition, which included about 1.22% by weight of saccharin, about 0.28% by weight of acetyl phenylhydrazine, about 0.2% by weight of N,N-diethyl-p-toluidine, about 0.122% by weight of N,N-dimethyl-o-toluidine, about 0.32% by weight of maleic acid, and about 2.26% by weight of cumene hydroperoxide was included.

Initially, the compositions were prepared by adding with mechanical mixing at room temperature the appropriate amounts of the (meth)acrylate component, maleimide component, if any, and diluent component in any order to 50 ml beakers, and thereafter adding the appropriate amounts of the components of the desired anaerobic cure-inducing composition (save cumene hydroperoxide).

The components were mixed for an appropriate period of time to allow for dissolution and/or dispersion, as the case may be, of the solid components. An appropriate amount of cumene hydroperoxide was then added portionwise, with mixing continued for an additional period of time of about 0.5 hours.

The so-formed formulations were stored for further use by covering the beaker ensuring that an air pocket remained between the surface of the formulation and the cover.

The components and amounts thereof used in by weight percentages in each of the sixteen formulations are presented in below Table 1.

TABLE 1

| Sample No. | Acrylate component total | Acrylate component individual | Maleimide component | Diluent component React. | Diluent component Non-react. |
|---|---|---|---|---|---|
| 1 | 66.38 | SiMA (52.68) HPMA (9.56) EPIBMA (4.14) | HVA-2 (15.02) | PDMS (5) | — |
| 2 | 61.38 | SiMA (48.70) HPMA (8.84) EPIBMA (3.84) | HVA-2 (15.02) | PDMS (10) | — |
| 3 | 51.38 | SiMA (40.78) HPMA (7.40) EPIBMA (3.22) | HVA-2 (15.02) | PDMS (20) | — |
| 4 | 41.58 | SiMA (32.84) HPMA (5.96) EPIBMA (2.58) | HVA-2 (15.02) | PDMS (30) | — |
| 5 | 66.38 | SiMA (52.68) HPMA (9.56) EPIBMA (4.14) | HVA-2 (15.02) | — | 5 |
| 6 | 61.38 | SiMA (48.70) HPMA (8.84) EPIBMA (3.84) | HVA-2 (15.02) | — | 10 |
| 7 | 51.38 | SiMA (40.78) HPMA (7.40) EPIBMA (3.22) | HVA-2 (15.02) | — | 20 |
| 8 | 41.38 | SiMA (32.84) HPMA (5.96) EPIBMA (2.58) | HVA-2 (15.02) | — | 30 |
| 9 | 81.40 | SiMA (64.60) HPMA (11.72) EPIBMA (5.08) | — | PDMS (5) | — |
| 10 | 76.40 | SiMA (60.61) HPMA (11.00) EPIBMA (4.78) | — | PDMS (10) | — |
| 11 | 66.40 | SiMA (52.68) HPMA (9.52) EPIBMA (4.14) | — | PDMS (20) | — |
| 12 | 56.40 | SiMA (44.76) HPMA (8.12) EPIBMA (3.52) | — | PDMS (30) | — |
| 13 | 81.40 | SiMA (64.60) HPMA (11.72) EPIBMA (5.08) | — | — | 5 |
| 14 | 76.40 | SiMA (60.62) HPMA (11.00) EPIBMA (4.78) | — | — | 10 |
| 15 | 66.40 | SiMA (52.68) HPMA (9.56) EPIBMA (4.14) | — | — | 20 |
| 16 | 56.40 | SiMA (44.76) HPMA (8.12) EPIBMA (3.52) | — | — | 30 |

A. Application, and Ambient Temperature Cure, of Controlled Strength Anaerobic Adhesive Composition The sample formulations set forth above in Table 1 were applied to five sets of degreased ⅜×16 steel fastener assemblies, which were then allowed to cure at room temperature for a period of time of about 24 hours. After the cure time, the fasteners were evaluated for break strength (i.e., torque required to turn the nut on the bolt of the fastener assembly), data for which are shown in below Tables 2a and 2b.

TABLE 2a

| Sample No. | 1 | 2 | 3 | 4 | 5 | 6 | 7 | 8 |
|---|---|---|---|---|---|---|---|---|
| Break Strength (in.lbs.) | 221 | 200 | 150 | 106 | 258 | 208 | 130 | 79 |

TABLE 2b

| Sample No. | 9 | 10 | 11 | 12 | 13 | 14 | 15 | 16 |
|---|---|---|---|---|---|---|---|---|
| Break Strength (in.lbs.) | 183 | 149 | 152 | 104 | 225 | 175 | 108 | 68 |

These data indicate that all sixteen formulations function at room temperature like a traditional anaerobic (meth) acrylate-based adhesive.

B. Hot Strength

Initially, the steel fasteners assembled with Sample Nos. 1–16 were evaluated for their hot strength performance after curing at room temperature and thereafter subjected to elevated temperatures of about 400° F. and about 500° F. for a period of time of about 2 hours. The fasteners were evaluated for break strength at that temperature, hot strength data for which are shown below in Tables 3a and 3b.

TABLE 3a

| Hot strength (in.lbs.) | Sample No. | | | | | | | |
|---|---|---|---|---|---|---|---|---|
| | 1 | 2 | 3 | 4 | 5 | 6 | 7 | 8 |
| 400° F. | 257 | 256 | 203 | 125 | 250 | 230 | 143 | 83 |
| 500° F. | 220 | 229 | 173 | 119 | 190 | 160 | 83 | 53 |

TABLE 3b

| Hot strength (in.lbs.) | Sample No. | | | | | | | |
|---|---|---|---|---|---|---|---|---|
| | 9 | 10 | 11 | 12 | 13 | 14 | 15 | 16 |
| 400° F. | 178 | 147 | 105 | 60 | 94 | 52 | 26 | 20 |
| 500° F. | 131 | 115 | 89 | 48 | 42 | — | — | — |

Hot strength is increased due to presence of the maleimide component in Sample Nos. 1–8. Increasing the concentration of diluent (whether or not reactive), however, decreases the hot strength, which is desirable in the context of this invention; however, those samples containing reactive diluent and maleimide (Nos. 1–4) show a controlled reduction of strength. Contrast Sample Nos. 3 with 7. This is even more clearly shown where the maleimide component has not been included in the samples—that is, in Sample Nos. 9–16. Contrast Sample Nos. 11 (reactive diluent) with 15 (non-reactive diluent).

C. Accelerated Heat Acing

Steel fasteners prepared with Sample Nos. 1–4 in accordance with the present invention demonstrated relatively consistent resistance to thermal degradation over time. This is contrasted to steel fasteners prepared with Sample Nos. 5–8 where a more pronounced reduction in break strength was seen over time under such elevated temperature conditions. More specifically, for examples comparing Sample No. 1 with Sample No. 5, where the percentages of the components are the same but the difference resides in the type of diluent used—reactive diluent in Sample No. 1 or non-reactive diluent in Sample No. 5—, it was seen that after a period of time of about 2 weeks at a temperature of about 400° F. only about 2 inch pounds of break strength was lost with Sample No. 1 and after a period of 3 weeks at such temperature only about 11 inch pounds was lost. However, with steel fasteners assembled with Sample No. 5, about 25 inch pounds of break strength was lost after a period of about two weeks at such temperatures and about 26 inch pounds was lost after a period of about three weeks. Similar performance differences were seen with the remaining samples (Nos. 2–4 and 6–8) which included a (meth)acrylate component, a maleimide component and a diluent (whether reactive or non-reactive) component.

The impact of the maleimide component in the performance of these compositions was seen by comparing, for example, steel fasteners assembled with Sample No. 1 and those assembled with Sample No. 9. Without the maleimide component, Sample No. 9 demonstrated an initial break strength at room temperature of about 183 inch pounds. This strength is reduced to about 66 inch pounds after only a period of about 1 week at a temperature of about 400° F. The strength is further reduced to about 41 inch pounds and about 33 inch pounds after periods of time of about two weeks and about three weeks, respectively. In contrast, inclusion of the maleimide component (Sample No. 1) demonstrated an initial break strength after a twenty-four hour, room temperature cure of about 221 inch pounds, which was reduced to about 141 inch pounds after a period of about 1 week at a temperature of about 400° F. Then, after periods of time of about 2 weeks and about 3 weeks at that temperature, the strength of the bond was seen to decrease only to about 139 inch pounds and about 130 inch pounds, respectively.

Steel fasteners assembled with Sample No. 3 illustrated a prevailing torque of 211 inch pounds after subjection to a temperature of about 400° F. for a period of time of about 1 week, and about 153 inch pounds after a period of time of about three weeks of that temperature. Thus, it is seen that the addition of a reactive diluent component permits the reduced strength demonstrated by the cured adhesive formulation to be maintained even after subjection to elevated temperature conditions for extended periods of time.

The accelerated heat aging data in inch pounds obtained from the evaluation at a temperature of about 400° F. are set forth below in Tables 4a and 4b.

TABLE 4a

| Break Strength (in.lbs.) | Sample No. | | | | | | | |
|---|---|---|---|---|---|---|---|---|
| | 1 | 2 | 3 | 4 | 5 | 6 | 7 | 8 |
| 1 week @ 400° F. | 141 | 146 | 185 | 159 | 221 | 194 | 152 | 64 |
| 2 weeks @ 400° F. | 139 | 147 | 166 | 145 | 196 | 186 | 85 | 53 |
| 3 weeks @ 400° F. | 130 | 124 | 150 | 117 | 195 | 161 | 62 | 44 |

TABLE 4b

| Break Strength (in.lbs.) | Sample No. | | | | | | | |
|---|---|---|---|---|---|---|---|---|
| | 9 | 10 | 11 | 12 | 13 | 14 | 15 | 16 |
| 1 week @ 400° F. | 66 | 65 | 50 | 50 | 48 | 27 | 20 | — |
| 2 weeks @ 400° F. | 41 | 68 | 53 | 39 | 28 | 19 | — | — |
| 3 weeks @ 400° F. | 33 | 39 | 46 | 34 | 24 | 18 | — | — |

Depending on the particular application for which the anaerobic adhesive composition is destined, different break strengths and prevailing torque values may be considered acceptable to accomplish the goal at hand. For many applications, break strength is an important parameter because once a fastener (e.g., a nut from a nut and bolt assembly) turns, the clamping force is effectively lost. The prevailing torque value, on the other hand, informs the user of when the fastener will come apart.

For certain applications, a high break strength value is particularly desirable. Examples of those applications are ones where a maintenance-free or tamper-proof machine is the type of apparatus with which such an anaerobic adhesive composition is to be used. For other applications, a lower break strength is desirable. Examples of such other applications include removable threadlockers where the machine is desirably maintained at regular intervals. Thus, it is seen that commercially-acceptable anaerobic adhesive compositions will have different break strength and prevailing torque values depending on the use to which that composition is placed.

With respect to controlled strength anaerobic adhesive compositions, desirable applications include those where fastener assemblies are small such that the strength of the bond formed by the cured adhesive does not exceed the proof load of the assembly. In this way, the integrity of the fastener assembly is maintained without breaking, twisting or stretching, which could occur with a high strength anaerobic adhesive.

II. Preparation of Further Anaerobic Adhesive Compositions

Anaerobic adhesive compositions were prepared using the components and amounts indicated below in Table 5. For comparative purposes, certain of the compositions contained no coreactant and/or maleimide component.

TABLE 5

| Sample No. | Acrylate (by weight %) | Coreactant (by weight %) | Maleimide (by weight %) |
|---|---|---|---|
| 17 | PEGMA (95) | — | — |
| 18 | PEGMA (75) | TAC (20) | — |
| 19 | PEGMA (60) | TAC (20) | NPM (15) |
| 20 | PEGMA (55) | TAC (20) | NPM (15) BMI-70 (5) |
| 21 | PEGMA (47.6) EBIPMA (10) | TAC (20) | BMI (10) NPM-70 (4) |
| 22 | PEGMA (51.2) EBIPMA (10) | TAC (20) | NPM (10) BMI-70 (4) |
| 23 | PEGMA (75.5) | TAC (20) | — |
| 24 | PEGMA (75.5) | TAI (20) | — |
| 25 | PEGMA (75) | TAT (20) | — |
| 26 | PEGMA (65.5) | TAI (20) | NPM (10) |
| 27 | PEGMA (65.5) | TAC (20) | NPM (10) |
| 28 | PEGMA (89.8) | TAC (10) | — |
| 29 | PEGMA (79.8) | TAC (20) | — |

For Sample Nos. 17–27, between about 4.5% and about 6% by weight of an anaerobic cure-inducing component was used. More specifically, for Sample Nos. 17–24 and 26–27, this component included about 1% by weight of saccharin, about 0.4% by weight of acetyl phenylhydrazine, about 0.7% by weight of N,N-diethyl-p-toluidine, about 0.2% by weight of N,N-dimethyl-o-toluidine, about 1% by weight of maleic acid, and about 0.7% by weight of cumene hydroperoxide was included. For Sample No. 25, the component included about 2% by weight of saccharin, about 0.2% by weight of acetyl phenylhydrazine, about 0.32% by weight of N,N-diethyl-p-toluidine, about 0.2% by weight of N,N-dimethyl-o-toluidine, about 0.8% by weight of maleic acid, and about 0.6% by weight of cumene hydroperoxide. For Sample Nos. 28 and 29, about 0.2% by weight of dicumyl peroxide was included instead as the anaerobic cure-inducing component to be consistent with the express disclosure of the '176 patent. Also, in Sample No. 28, 10% by weight of triallyl cyanurate was used to be consistent with the express disclosure of the '176 patent.

Initially, the samples were prepared by adding with mechanical mixing at room temperature the appropriate amounts of the acrylate component, and, if any coreactant and maleimide component in any order to 50 ml beakers, and thereafter adding the appropriate amounts of the components of the desired anaerobic cure-inducing composition (save cumene hydroperoxide with respect to Sample Nos. 17–27).

The components were mixed for an appropriate period of time to allow for dissolution of all of the solid components. With respect to Sample Nos. 17–27, an appropriate amount of cumene hydroperoxide was then added portionwise, with mixing continued for an additional period of time of about 0.5 hours.

The so-formed formulations were stored for further use by covering the beaker ensuring that an air pocket remained between the surface of the formulation and the cover.

A. Application of Anaerobic Adhesive Compositions to Desired Substrate, and Cure Thereof Sample Nos. 17–29 were applied in a wicking application to five sets of pre-assembled degreased 3/8×16 grade 2 nuts and grade 5 bolts, which were then allowed to cure at room temperature for a period of time of about 24 hours and typically up to a period of about 72 hours. After the cure time, the nut and bolt assemblies were evaluated for strength and thermal performance through accelerated heat aging as described below.

B. Room Temperature Performance of Cured Anaerobic Adhesive Compositions

The nut and bolt assemblies onto which certain of the samples were applied were evaluated for break strength and prevailing torque after a period of time of about 24 hours at ambient temperature conditions and then again after a period of time of about 72 hours at ambient temperature conditions. The room temperature strength data for Samples Nos. 17–27 are set forth in Tables 6a and 6b below.

TABLE 6a

| Property | Sample No. | | | | |
|---|---|---|---|---|---|
| (in.lbs.) | 17 | 18 | 19 | 20 | 21 |
| Break Strength (24 hr) | 104 | 93 | 165 | 173 | 150 |
| Prevailing Torque (24 hr) | 182 | 206 | 284 | 296 | 269 |
| Break Strength (72 hr) | 106 | 107 | — | — | — |
| Prevailing Torque (72 hr) | 198 | 172 | — | — | — |

TABLE 6b

| Property | Sample No. | | | | | |
|---|---|---|---|---|---|---|
| (in.lbs.) | 22 | 23 | 24 | 25 | 26 | 27 |
| Break Strenqth (24 hr) | 185 | 78 | 115 | 129 | 144 | 108 |
| Prevailing Torque (24 hr) | 205 | 146 | 164 | 220 | 160 | 215 |
| Break Strength (72 hr) | — | 101 | 124 | 127 | 178 | 92 |
| Prevailing Torque (72 hr) | — | 113 | 194 | 232 | 193 | 154 |

Sample Nos. 28 and 29 did not cure during the 24 hour period under these ambient temperature conditions and thus no values were obtained. However, following the cure procedure set forth in the '176 patent [i.e., (1) elevating the temperature to about 170° C. for a period of time of about 0.5 hours and (2) placing the nut and bolt assemblies in boiling water for a period of time of about 2 hours], the nut and bolt assemblies on which was applied the formulation of Sample Nos. 26 and 27 exhibited a break strength of about 30 inch pounds and 29 inch pounds, respectively, and a prevailing torque of about 136 inch pounds and 201 inch pounds, respectively.

C. High Temperature Performance of Cured Anaerobic Adhesive Compositions

The assemblies were thereafter evaluated after one week of subjection to elevated temperatures of about 400° F., and then again as to those assemblies which used Sample Nos. 17–21 after three weeks and six weeks and as to those assemblies which used Sample Nos. 23–24 and 26–27 after three weeks and sixty-one days at such temperature.

The values obtained from the accelerated heat aging at elevated temperatures are set forth below in Tables 7a and 7b.

TABLE 7a

| Property | Sample Nos. | | | | |
|---|---|---|---|---|---|
| (in.lbs.) | 17 | 18 | 19 | 20 | 21 |
| Break Strength (1 week) | 57 | 75 | 104 | 134 | 109 |
| Prevailing Torque (1 week) | 49 | 84 | 201 | 330 | 254 |
| Break Strength (3 weeks) | 14 | 36 | 106 | 138 | 92 |
| Prevailing Torque (3 weeks) | 7 | 34 | 282 | 267 | 225 |
| Break Strength (6 weeks) | 0 | 30 | 126 | 103 | 95 |
| Prevailing Torque (6 weeks) | 0 | 67 | 163 | 201 | 91 |

TABLE 7b

| Property | Sample No. | | | | | |
|---|---|---|---|---|---|---|
| (in.lbs.) | 22 | 23 | 24 | 25 | 26 | 27 |
| Break Strength (1 week) | — | 70 | 25 | 35 | 71 | 66 |
| Prevailing Torque (1 week) | — | 115 | 63 | 82 | 154 | 145 |
| Break Strength (3 weeks) | — | 29 | 19 | — | 28 | 47 |
| Prevailing Torque (3 weeks) | — | 86 | 44 | — | 87 | 71 |
| Break Strength (61 days) | — | 7 | 4 | — | 6 | 9 |
| Prevailing Torque (61 days) | — | 6 | 3 | — | 22 | 13 |

Depending on the particular application for which the anaerobic composition is destined, different break strengths and prevailing torque values may be considered acceptable to accomplish the goal at hand. For many applications, break strength is an important parameter because once a fastener (e.g., a nut from a nut and bolt assembly) turns, the clamping force is effectively lost.

The prevailing torque value, on the other hand, informs the user of when the fastener will come apart.

For certain applications, a high break strength value is particularly desirable. Examples of those applications are ones where a maintenance-free or tamper-proof machine is the type of apparatus with which such an anaerobic adhesive composition is to be used. For other applications, a low break strength is desirable. Examples of such other applications include removable threadlockers where the machine is desirably maintained at regular intervals. Thus, it is seen that commercially-acceptable anaerobic adhesive compositions will have different break strength and prevailing torque values depending on the use to which that composition is placed.

III. Preparation of Impregnant Sealant Compositions

Impregnant sealant compositions in accordance with this invention were prepared using the components and amounts indicated below in Tables 8a and 8b.

These compositions are curable under anaerobic and/or elevated temperature conditions.

TABLE 8a

| Sample | Acrylate component | | | Maleimide component |
|---|---|---|---|---|
| No. | total | individual | Coreactant | (BMI-70) |
| 30 | — | TRIEGMA LAURYLMA HPMA | — | — |
| 31 | 74 | TRIEGMA (54) LAURYLMA (15) HPMA (5) | TAC (20) | — |
| 32 | 90 | TRIEGMA (70) LAURYLMA (15) HPMA (5) | — | 4 |
| 33 | 70 | TRIEGMA (50) LAURYLMA (15) HPMA (5) | TAC (20) | 4 |
| 34 | 88 | TRIEGMA (68) LAURYLMA (15) HPMA (5) | — | 6 |
| 35 | 58 | TRIEGMA (38) LAURYLMA (15) HPMA (5) | TAC (30) | 6 |
| 36 | 64 | TRIEGMA (44) LAURYLMA (15) HPMA (5) | TAI (30) | — |
| 37 | 58 | TRIEGMA (38) LAURYLMA (15) HPMA (5) | TAI (30) | 6 |

*LAURYLMA represents Lauryl (meth) acrylate.

In each of Sample Nos. 30–37 was included about 5.24% weight of "MAZON" 93 (commercially available from PPG/Industries, Inc., Gurnee, Ill.) as a demulsifying agent, and about 0.02% by weight of fluorescence, and about 0.05% weight of an inhibitor, about 0.3% by weight of saccharin and about 0.4% by weight of t-butyl hydroxyperxide, in combination as an anaerobic cure-inducing composition.

Sample 30, sold commercially by Loctite Corporation under the trademark "RESINOL RTC", was used as a control for these impregnant formulations.

TABLE 8b

| Sample | Acrylate component | | | Maleimide component |
|---|---|---|---|---|
| No. | Total | individual | Coreactant | (BMI-70) |
| 38 | — | TRIEGMA LAURYLMA HPMA | — | — |
| 39 | 74 | TRIEGMA (54) LAURYLMA (15) HPMA (5) | TAC (20) | — |
| 40 | 90 | TRIEGMA (70) LAURYLMA (15) HPMA (5) | — | 4 |
| 41 | 70 | TRIEGMA (50) LAURYLMA (15) HPMA (5) | TAC (20) | 4 |
| 42 | 88 | TRIEGMA (68) LAURYLMA (15) HPMA (5) | — | 6 |
| 43 | 58 | TRIEGMA (38) LAURYLMA (15) HPMA (5) | TAC (30) | 6 |
| 44 | 64 | TRIEGMA (44) LAURYLMA (15) HPMA (5) | TAI (30) | — |

TABLE 8b-continued

| Sample No. | Acrylate component | | Coreactant | Maleimide component (BMI-70) |
|---|---|---|---|---|
| | Total | individual | | |
| 45 | 58 | TRIEGMA (38) LAURYLMA (15) HPMA (5) | TAI (30) | 6 |

These samples too were prepared along the lines set forth in Example 2, supra.

In each of Sample Nos. 38–45 was included about 5.17% weight of "MAZON" 93 (commercially available from PPG/Industries, Inc., Gurnee, Ill.) as a demulsifying agent, and about 0.02% by weight of fluorescence, and about 0.05% by weight of hydroquinone, 0.06% by weight of butylated hydroxy toluenes, about 0.2% by weight of acetophosphonic acid as a chelator and 0.5% by weight of "VAZO" 67 (commercially available from E. I. du Pont de Nemours and Company, Inc., Wilmington, Del.) as a free radical initiator.

Sample No. 38, sold commercially by Loctite Corporation under the trademark "RESINOL 90C", was used as a control for these impregnant formulations.

A. Application of Impregnant Sealant Compositions to Desired Porous Substrate, and Cure Thereof When the impregnant sealant composition is impregnated in the porosity of the parts to be sealed, the impregnated parts may be heated to effect heat curing of the composition, with polymerization of the resin or monomer component of the impregnant and cross-linking of the maleimide component with the polymerizable monomer or resin, in the case of heat-cure impregnant sealant formulations. Alternatively, even in the case of anaerobic impregnant sealant compositions, the sealant composition may also be heated after impregnation has been effected, in order to effect cross-linking of the maleimide component with the polymerizable resin or monomer of the sealant composition, and to accelerate the anaerobic cure.

In certain applications, non-thermal curing impregnation sealing composition, such heating may be omitted and curing may be carried out at ambient (e.g., room temperature) conditions. In such instances, the maleimide component should enhance the physical properties of the cured sealant composition. However, the high temperature resistance properties of the cured impregnant sealant should be significantly increased after heating to cause cross-linking of the maleimide component with at least the monomer component of the sealant composition. In some instances involving anaerobic cure formulations, for example, it may be desirable to carry out partial or initial polymerization of the monomer under non-elevated temperature, anaerobic conditions, and to then heat the formulation to cross-link the maleimide component and the monomer as an interpolymerized reaction product. Thus, secondary heating and post-cure heat treatment of the sealant composition is contemplated in the broad practice of this aspect of the invention.

B. High Temperature Performance of Cured Impregnant Sealant Compositions

These sample impregnant formulations were used to seal the pores of a porous powdered metal part in their ordinary way. That is, the samples were placed in a container and Sample Nos. 30–37 were cured under anaerobic conditions and Sample Nos. 38–45 were ured by elevating the surrounding temperature to at least about 90° C.

The percent weight loss (in grams) of the cured formulations over time at an elevated temperature of about 400° F. was measured and the results are recorded below in Tables 9a and 9b. For convenience and brevity, only the measurements as obtained from the first set of duplicate test pieces are presented.

TABLE 9a

| Sample No. | Initial weight | 2 days | | 4 days | | 7 days | | 14 days | |
|---|---|---|---|---|---|---|---|---|---|
| | | weight | % change | weight | % change | weight | % change | weight | % change |
| 30 | 1.626 | 0.468 | 71.22 | 0.358 | 77.98 | 0.33 | 79.7 | 0.907 | 81.12 |
| 31 | 1.564 | 0.974 | 37.72 | 0.845 | 45.97 | 0.787 | 49.68 | 0.752 | 51.92 |
| 32 | 0.971 | 0.435 | 55.2 | 0.346 | 64.37 | 0.321 | 66.94 | 0.296 | 69.52 |
| 33 | 1.541 | 0.984 | 36.15 | 0.968 | 37.18 | 0.829 | 46.2 | 0.795 | 48.41 |
| 34 | 1.535 | 0.831 | 45.86 | 0.675 | 56.03 | 0.615 | 59.93 | 0.554 | 63.91 |
| 35 | 1.582 | 1.337 | 15.49 | 1.098 | 30.59 | 1.034 | 34.64 | 0.996 | 37.04 |
| 36 | 1.566 | 0.984 | 37.16 | 0.908 | 42.02 | 0.845 | 46.04 | 0.773 | 50.64 |
| 37 | 1.542 | 1.118 | 27.5 | 1.038 | 32.68 | 0.973 | 36.9 | 0.897 | 41.83 |

TABLE 9b

| Sample No. | Initial weight | 2 days | | 4 days | | 7 days | | 14 days | |
|---|---|---|---|---|---|---|---|---|---|
| | | weight | % Change | weight | % Change | weight | % Change | weight | % Change |
| 38 | 1.36 | 0.607 | 55.37 | 0.467 | 65.66 | 0.42 | 69.12 | 0.396 | 70.88 |
| 39 | 1.451 | 0.991 | 31.7 | 0.858 | 40.87 | 0.787 | 45.76 | 0.747 | 48.52 |
| 40 | 1.404 | 0.843 | 39.96 | 0.657 | 53.21 | 0.588 | 58.12 | 0.543 | 61.32 |
| 41 | 1.542 | 1.092 | 29.18 | 0.951 | 38.33 | 0.876 | 43.19 | 0.785 | 49.09 |
| 42 | 1.524 | 1.334 | 12.47 | 1.106 | 27.43 | 0.96 | 37.01 | 0.844 | 44.62 |
| 43 | 1.529 | 1.186 | 22.43 | 1.074 | 29.76 | 1.019 | 33.36 | 0.968 | 36.98 |
| 44 | 1.624 | 0.989 | 39.1 | 0.894 | 44.95 | 0.821 | 49.45 | 0.717 | 55.85 |
| 45 | 1.483 | 0.966 | 34.86 | 0.891 | 39.92 | 0.84 | 43.36 | 0.753 | 49.22 |

IV. Preparation of Silicone-based Anaerobic Adhesives
A. Preparation of SiMA

Into a 1 liter, 3-necked round bottom flask, equipped with a mechanical stirrer, thermometer and addition funnel, was charged 65.1 grams of trimethylchlorosilane, 79.2 grams of phenyltrimethoxysilane, 148.8 grams of methacryloxypropyl trimethoxysilane, and 83.2 grams of tetraethoxysilane. In addition, 120 grams of cyclohexane was also charged into the flask. Water (67.1 grams) was slowly added to the mixture over a period of about one-half hour with vigorous stirring. The temperature of the reaction mixture was maintained at less than 45° C. during this mixing period. The mixture was heated to 70° C. with nitrogen sparge to remove methanol. The reaction mixture was then cooled and diluted with approximately 300 ml cyclohexane. The cyclohexane solution was separated and washed repeatedly with water and solid sodium bicarbonate, filtering any solid salts generated, and residual sodium bicarbonate. Then, the cyclohexane was stripped under a nitrogen sparge at a temperature of about 60° C. overnight. Cyclohexane was then removed under reduced pressure to yield a liquid resin with a viscosity of 4,000 cps. This resin is an example of a resin within the definition of SiMA.

B. Formulation of Silicone-based Anaerobic Adhesives

Eight formulations were prepared with, among other things, SiMA and a (meth)acrylate component, including various combinations of HPMA and EBIPMA. Sample Nos. 46–49 also included about 15% by weight of HVA-2 as a maleimide component; Sample Nos. 50–53 were formulated without any such maleimide component.

Each of the eight formulations contained a diluent component—Sample Nos. 46–47 and 50–51 were formulated with vinyl-terminated polydimethyl siloxane, and Sample Nos. 48–49 and 52–53 were formulated with poly(ethylene glycol) (200) monooleate. Sample Nos. 46, 48, 50 and 52 contained about 5% by weight, and Sample Nos. 47, 49, 51 and 53 contained about 10% by weight of the respective diluent component.

For each of the samples, about 4.78% by weight of an anaerobic cure-inducing component (about 1.22% by weight of saccharin, about 0.28% by weight of acetyl phenylhydrazine, about 0.2% by weight of N,N-diethyl-p-toluidine, about 0.122% by weight of N,N-dimethyl-o-toluidine, about 0.32% by weight of maleic acid and about 2.26% by weight of cumene hydroperoxide) was included.

Initially, the compositions were prepared by adding with mechanical mixing at room temperature the appropriate amounts of the SiMA component, the (meth)acrylate component, the maleimide component, and the diluent component in any order to 50 ml beakers, and thereafter adding the appropriate amounts of the components of the desired anaerobic cure-inducing component (save cumene hydroperoxide).

The components were mixed for an appropriate period of time to allow for dissolution and/or dispersion, as the case may be, of the solid components. An appropriate amount of cumene hydroperoxide was then added portionwise, with mixing continued for an additional period of time of about 0.5 hours.

The so-formed formulations were stored for further use by covering the beaker ensuring that an air pocket remained between the surface of the formulation and the cover.

The components and amounts thereof used in by weight percentages in each of the eight formulations are presented below in Table 10. The additional weight percent to reach 100% is from the anaerobic cure-inducing composition and viscosity modifiers, such as silica fillers.

TABLE 10

| Sample No. | Acrylate component | | | Maleimide component |
|---|---|---|---|---|
| | Total | SiMA | Other Acrylate | |
| 46 | 66.38 | 52.68 | HPMA (9.56) EPIBMA (4.14) | 15.02 |
| 47 | 61.38 | 48.70 | HPMA (8.84) EPIBMA (3.84) | 15.02 |
| 48 | 66.38 | 52.68 | HPMA (9.56) EPIBMA (4.14) | 15.02 |
| 49 | 61.38 | 48.70 | HPMA (8.84) EPIBMA (3.84) | 15.02 |
| 50 | 81.40 | 64.60 | HPMA (11.72) EPIBMA (5.08) | — |
| 51 | 76.40 | 60.61 | HPMA (11.00) EPIBMA (4.78) | — |
| 52 | 81.40 | 64.60 | HPMA (11.72) EPIBMA (5.08) | — |
| 53 | 76.40 | 60.62 | HPMA (11.00) EPIBMA (4.78) | — |

B. Application and Ambient Temperature Cure of Silicone-based Anaerobic Adhesives The sample formulations set forth in Table 10 and described in Example IV(B) were applied to five sets of degreased ⅜×16 steel fastener assemblies, and then allowed to cure at room temperature for a period of time of about 24 hours. After the cure time, the fasteners were evaluated for break strength (i.e., torque required to turn the nut on the bolt of the fastener assembly), data for which as an average of the five sets are shown below in Table 11.

TABLE 11

| Sample No. | 46 | 47 | 48 | 49 | 50 | 51 | 52 | 53 |
|---|---|---|---|---|---|---|---|---|
| Break Strength (in.lbs.) | 221 | 200 | 258 | 208 | 183 | 149 | 225 | 175 |

These data indicate that all eight formulations function at room temperature like a traditional anaerobic (meth)acrylate-based adhesives.

C. Hot Strength

Initially, the steel fasteners assembled with Sample Nos. 46–53 were evaluated for their hot strength performance after curing at room temperature for a period of about 24 hours and thereafter subjected to elevated temperatures of about 400° F. and about 500° F. for a period of time of about 2 hours. The fasteners were evaluated for break strength at that temperature, hot strength data for which are shown below in Table 12.

TABLE 12

| Hot Strength (in.lbs.) | Sample No. | | | | | | | |
|---|---|---|---|---|---|---|---|---|
| | 46 | 47 | 48 | 49 | 50 | 51 | 52 | 53 |
| 400° F. | 257 | 256 | 250 | 230 | 178 | 147 | 94 | 52 |
| 500° F. | 220 | 229 | 190 | 160 | 131 | 115 | 42 | — |

These data indicated that hot strength is increased due to presence of the maleimide component. Compare Sample Nos. 46–49 with Sample Nos. 50–53.

D. Heat Aging

Steel fasteners prepared with Sample Nos. 46–49 in accordance with the present invention demonstrated relatively consistent resistance to thermal degradation over time.

This is contrasted to steel fasteners prepared with Sample Nos. 51–54 where a more pronounced reduction in break strength was seen over time under such elevated temperature conditions.

The change in the performance of these compositions due to the maleimide component may be seen by comparing, for example, steel fasteners assembled with Sample No. 46 and those assembled with Sample No. 50. Without the maleimide component, Sample No. 50 demonstrated an initial break strength at room temperature of about 183 inch pounds. This strength is reduced to about 66 inch pounds after only a period of about 1 week at a temperature of about 400° F. The strength is further reduced to about 41 inch pounds and about 33 inch pounds after periods of time of about two weeks and about three weeks, respectively. In contrast, inclusion of the maleimide component (Sample No. 46) demonstrated an initial break strength after a twenty-four hour, room temperature cure of about 221 inch pounds, which was reduced to about 141 inch pounds after a period of about 1 week at a temperature of about 400° F. Then, after periods of time of about 2 weeks and about 3 weeks at that temperature, the strength of the bond was seen to decrease only to about 139 inch pounds and about 130 inch pounds, respectively.

The heat aging data in inch pounds obtained from the evaluation at a temperature of about 400° F. are set forth below in Table 13.

TABLE 13

| Break strength | Sample No. | | | | | | | |
|---|---|---|---|---|---|---|---|---|
| (in.lbs./time) | 46 | 47 | 48 | 49 | 50 | 51 | 52 | 53 |
| 1 week @ 400° F. | 141 | 146 | 221 | 194 | 66 | 65 | 48 | 27 |
| 2 weeks @ 400° F. | 139 | 147 | 196 | 186 | 41 | 68 | 28 | 19 |
| 3 weeks @ 400° F. | 130 | 124 | 195 | 161 | 33 | 39 | 24 | 18 |

E. Formulation of Silicone-based Anaerobic Adhesives for Re-oiled Substrates

In this example, twenty-three formulations were prepared in a manner comparable to that described in Example IV(B). The components of the formulations are recited below in Table 14. The additional weight percent to reach 100% is made up of the anaerobic cure-inducing component, and/or chelator and viscosity modifiers, such as silica fillers.

TABLE 14

| Sample | Acrylate component | | | Maleimide |
|---|---|---|---|---|
| No. | Total | SiMA | Other Acrylate | component |
| 54 | 82.16 | 52.16 | HEMA (30) | — |
| 55 | 82.47 | 62.47 | EBIPMA (20) | — |
| 56 | 83.22 | 56.22 | HEMA (27) | 10 |
| 57 | 77 | 50 | HPMA (9)/EBIPMA (18) | 10 |
| 58 | 77.47 | 50 | EBIPMA (27.47) | 15 |
| 59 | 67.47 | 50 | EBIPMA (17.47) | 15 |
| 60 | 72.47 | 50 | HPMA (22.47) | 15 |
| 61 | 67.47 | 50 | HPMA (17.47) | 15 |
| 62 | 77.47 | 50 | HPMA (27.47) | 15 |
| 63 | 77.47 | 38.74 | EBIPMA (38.73) | 15 |
| 64 | 72.47 | 36.24 | EBIPMA (36.23) | 15 |
| 65 | 92.47 | 62.47 | HPMA (10)/TRIEGMA (20) | — |
| 66 | 92.44 | 77.44 | HPMA (5)/TRIEGMA (10) | — |
| 67 | 92.44 | 77.44 | HPMA (5)/TRIEGMA (10) | — |
| 68 | 80.01 | 59.41 | HPMA (20.60) | — |
| 69 | 72.87 | 50.45 | HPMA (22.42) | 15.1 |
| 70 | 77.89 | 50.45 | HPMA (27.44) | 15.1 |
| 71 | 93 | 65.1 | HPMA (27.90) | — |
| 72 | 88.01 | 60.11 | HPMA (27.90) | — |
| 73 | 81.52 | 43.3 | HPMA (16.38)/EBIPMA (21.84) | — |
| 74 | 60.65 | 60.65 | HPMA (22.97)/HEMA (0.47) | — |
| 75 | 85.52 | 46.75 | HPMA (28.69)/HEMA (10.08) | — |
| 76 | 90 | 75.22 | HPMA (9.02)/EBIPMA (1.22)/ TRIEGMA (4.54) | — |

The individual components used to prepare the SiMA were reacted together as described in Example IV(A), supra. Those components and amounts in mole percent used for each of the list SiMAs are set forth below in Table 15.

TABLE 15

| | Sample No./Amount | | | | | |
|---|---|---|---|---|---|---|
| Component | 9 | 10 | 11 | 12 | 13 | 14 |
| Trimethylchlorosilane | 0.3 | 0.3 | 0.3 | 0.3 | 0.3 | 0.3 |
| Methacryloxypropyl-trimethyoxysilane | 0.4 | 0.4 | 0.4 | 0.4 | 0.4 | 0.4 |
| Phenyltrimethoxysilane | 0.2 | 0.2 | 0.2 | 0.2 | 0.2 | 0.2 |
| Tetraethoxysilane | 0.1 | 0.1 | 0.1 | 0.1 | 0.1 | 0.1 |
| | Sample No./Amount | | | | | |
| Component | 15 | 16 | 17 | 18 | 19 | 20 |
| Trimethylchlorosilane | 0.3 | 0.3 | 0.3 | 0.3 | 0.3 | 0.3 |
| Methacryloxypropyl-trimethyoxysilane | 0.4 | 0.4 | 0.2 | 0.4 | 0.4 | 0.4 |
| Phenyltrimethoxysilane | 0.2 | 0.2 | — | 0.2 | 0.2 | 0.2 |
| Tetraethoxysilane | 0.1 | 0.1 | 0.5 | 0.1 | 0.1 | 0.1 |
| | Sample No./Amount | | | | | |
| Component | 21 | 22 | 23 | 24 | 25 | 26 |
| Trimethylchlorosilane | 0.4 | 0.3 | 0.25 | 0.25 | 0.25 | 0.25 |
| Methacryloxypropyl-trimethyoxysilane | 0.2 | 0.2 | 0.38 | 0.38 | 0.38 | 0.38 |
| Phenyltrimethoxysilane | 0.2 | 0.5 | 0.18 | 0.18 | 0.18 | 0.18 |
| Tetraethoxysilane | 0.2 | — | 0.19 | 0.19 | 0.19 | 0.19 |
| | Sample No./Amount | | | | | |
| Component | 27 | 28 | 29 | 30 | 31 | |
| Trimethylchlorosilane | 0.25 | 0.28 | 0.3 | 0.3 | 0.3 | |
| Methacryloxypropyl-trimethyoxysilane | 0.38 | 0.38 | 0.4 | 0.4 | 0.4 | |
| Phenyltrimethoxysilane | 0.18 | 0.18 | 0.2 | 0.2 | 0.2 | |
| Tetraethoxysilane | 0.19 | 0.19 | 0.1 | 0.1 | 0.1 | |

All of the samples contained 1.50 percent by weight of silica as a filler, and certain of the samples contained a bis-fumarate derivative and a chelator (i.e., EDTA). Sample Nos. 54, 56, 59, 61, 64, 67, 68, 71, 73 and 74 contained the bis-fumarate in the following respective amounts percent by weight: 10, 9, 10, 10, 5, 11.72, 5.02, 5, 6.6 and 5.46. And the amounts in percent by weight of the chelator were: 1.28 (Sample No. 72), 1.30 (Sample Nos. 68, 69, 70 and 71) 1.35 (Sample Nos. 56 and 57), 1.36 (Sample No. 73), 1.50 (Sample Nos. 54, 55, and 58–67), 1.69 (Sample No. 74) and 2.42 (Sample No. 75).

F. Application and Ambient Temperature Cure of Silicone-based Anaerobic Adhesives for Re-oiled Substrates As in Example II(B), supra, Sample Nos. 54–76 were applied to five sets of degreased ⅜×16 steel fastener assemblies and five sets of such assemblies, the nuts and bolts of which after degreasing were then re-oiled with a 5% oil in water emulsion where the nuts and bolts were immersed in the emulsion and thereafter dried.

These assemblies were then allowed to cure at room temperature for a period of about one hour. The break strength and prevailing torque was measured and reported below in Table 16.

An additional five sets of each were assembled with the anaerobic adhesive and allowed to cure at room temperature for a period of time of about 24 hours. The break strength and prevailing torque of the five sets were measured and are reported as an average below in Table 17.

TABLE 16

1 Hour Cure

| | Assembly | | | |
|---|---|---|---|---|
| | Degreased | | Re-oiled | |
| Sample No. | Break Strength | Prevailing Torque | Break Strength | Prevailing Torque |
| 54 | 280.5 | 182.5 | 189.5 | 227.5 |
| 55 | 207 | 194.5 | 171 | 201 |
| 56 | 337 | 342 | 197 | 276 |
| 57 | 267 | 318 | 120 | 244 |
| 58 | — | — | 23 | 36 |
| 59 | — | — | 29 | 42 |
| 60 | 218 | 296 | 168 | 253 |
| 61 | 162 | 247 | 133 | 210 |
| 62 | 285 | 307 | 171 | 279 |
| 63 | 49 | 64 | 83 | 111 |
| 64 | 62 | 58 | 74 | 165 |
| 65 | 123 | 211 | 70 | 125 |
| 66 | 17 | 32 | 20 | 21 |
| 67 | 25 | 62 | 39 | 63 |
| 68 | 157 | 228 | 143 | 246 |
| 69 | 235 | 287 | 167 | 214 |
| 70 | 243 | 230 | 164 | 198 |
| 71 | 194 | 255 | 146 | 229 |
| 72 | 196 | 221 | 142 | 224 |
| 73 | 147 | 205 | 111 | 105 |
| 74 | 114 | 166 | 115 | 228 |
| 75 | 180 | 240 | 105 | 238 |
| 76 | 88 | 167 | 83 | 193 |

TABLE 17

24 hour cure

| | Assembly | | | |
|---|---|---|---|---|
| | Degreased | | Re-oiled | |
| Sample No. | Break Strength | Prevailing Strength | Break Strength | Prevailing Strength |
| 54 | 260 | 198 | 210 | 206 |
| 55 | 190 | 138 | 168 | 245 |
| 56 | 295 | 273 | 307 | 362 |
| 57 | 226 | 293 | 127 | 265 |
| 58 | 253 | 324 | 192 | 215 |
| 59 | 239 | 178 | 286 | 222 |
| 60 | 252 | 215 | 263 | 183 |
| 61 | 299 | 160 | 274 | 169 |
| 62 | 302.5 | 264 | 199 | 197 |
| 63 | 222 | 294 | 121 | 294 |
| 64 | 217 | 314 | 130 | 281 |
| 65 | 210 | 187 | 161 | 152 |
| 66 | 184 | 130 | 173 | 121 |
| 67 | 211 | 122 | 193 | 173 |
| 68 | 269 | 246 | 163 | 257 |
| 69 | 277 | 267 | 92 | 221 |
| 70 | 243 | 283 | 93 | 201 |
| 71 | 264 | 235 | 182 | 281 |
| 72 | 265 | 252 | 131 | 253 |
| 73 | 162 | 294 | 125 | 170 |
| 74 | 310 | 271 | 220 | 345 |
| 75 | 333 | 316 | 131 | 261 |
| 76 | 198 | 251 | 174 | 209 |

G. Heat Aging

Finally, two additional five sets of each assembly were cured at room temperature for a period of time of about 24 hours, and then subjected to heat aging studies, along the lines described in Example II(D), supra. The heat aging studies here included measuring the break strength of nut and bolt assemblies which had been cured at room temperature for a period of time of about 24 hours and thereafter subjected first to an elevated temperature of about 400° F. for a period of time of about 1 week (7 days), or alternatively for a period of time of about 500° F. for a period of time of about 3 days. The respective assemblies were then tested when they reached room temperature. The break strength of each assembly was measured and an average of the five sets is reported below in Table 18.

TABLE 18

| | Sample No. | | | | | | | | | | | |
|---|---|---|---|---|---|---|---|---|---|---|---|---|
| Property | 54 | 55 | 56 | 57 | 58 | 59 | 60 | 61 | 62 | 63 | 64 | 65 |
| 1 week @ 400° F. | 90 | 209 | 251 | 298 | 221 | 194 | 137 | 289 | 161.5 | 227 | 243.5 | 39 |
| 3 days @ 500° F. | 0 | 17 | 21 | 41 | 98.5 | 144 | 0 | 49 | 0 | 18 | 84.5 | 0 |

| | Sample No. | | | | | | | | | | |
|---|---|---|---|---|---|---|---|---|---|---|---|
| Property | 66 | 67 | 68 | 69 | 70 | 71 | 72 | 73 | 74 | 75 | 76 |
| 1 week @ 400° F. | 73 | 97 | 125 | 216 | 92 | 31 | 51 | 0 | 44 | 40 | — |
| 3 days @ 500° F. | 18 | 31 | 19 | 18 | 18 | 0 | 0 | 0 | — | — | — |

V. Poly-hydroxyalkane Effect on Silicon-based Anaerobic Adhesive

In this example, the effect of the addition of a poly-hydroxyalkane on the strength profile of cured anaerobic silicone formulations was determined. The formulation set forth below in Table 19 was used as a control (Sample No. 77).

TABLE 19

| Component | Amount (weight %) |
|---|---|
| SiMA | 60 |
| HPMA 10.28 | 14.78 |
| EPIBMA 4.5 | |
| HVA-2 | 15 |
| EDTA* | 0.04 |
| Anaerobic cure-inducing composition | 4.59 |

*dissolved in 0.9 g of propylene glycol and 0.3 g of water

The remaining 5.59% by weight was made up of fillers and dye.

Formulations with different poly-hydroxyalkanes in varying amounts were prepared with the same remaining components as set forth below in Table 19. For each percent by weight poly-hydroxyalkane added to a sample formulation, that percent by weight amount of SiMA was omitted from the sample formulation.

TABLE 20

| Sample No. | Poly-hydroxyalkane | Amount (weight %) |
|---|---|---|
| 78 | 1,2-Propanediol | 1 |
| 79 | 1,2-Propanediol | 3 |
| 80 | 1,2-Propanediol | 4 |
| 81 | 1,2-Propanediol | 5 |
| 82 | 1,3-Propanediol | 1 |
| 83 | 1,3-Propanediol | 2 |
| 84 | 1,3-Propanediol | 3 |
| 85 | 1,3-Propanediol | 4 |
| 86 | 1,6-Hexanediol | 1 |
| 87 | 1,6-Hexanediol | 3 |
| 88 | 1,6-Hexanediol | 4 |
| 89 | 1,6-Hexanediol | 5 |
| 90 | 1,6-Hexanediol | 6 |

Each of Sample Nos. 77–90 were applied to five sets of degreased ⅜×16 steel fastener assemblies, and allowed to cure for a period of time of up to 15 minutes. The fixture times are set forth below in Table 21.

These samples were also applied to steel fastener assemblies, and allowed to cure at ambient temperature conditions for a period of time of about 1 hour. Break strength and prevailing torque measurements were obtained for each sample and are also set forth below in Table 21, with the upper value representing break strength and the lower value representing prevailing torque.

Next, the samples were evaluated for cure strength at ambient temperature conditions after periods of time of about 24 hours and 72 hours. Break strength and prevailing torque measurements were again obtained for each sample and are too set forth below in Table 21. The upper value represents break strength and the lower value represents prevailing torque.

The cure strength of the samples at ambient temperature conditions after a period of time of about 24 hours was compared on ⅜×16 zinc and stainless steel substrates. Break strength and prevailing torque measurements were again obtained and are set forth below in Table 21.

TABLE 21

| Sample No. | Fixture time (min) | Steel Cure Strength @ RT 1 hr | 24 hrs | 72 hrs | Hot Str. 2 hrs @ 500° F. | Zinc/Stainless Cure Strength 24 hrs @ RT | |
|---|---|---|---|---|---|---|---|
| 77 | 13 | 16 | 326 | 297 | 317 | 144 | 154 |
| | | 39 | 79 | 87 | 69 | 64 | 113 |
| 78 | 7 | 193 | 264 | 266 | 308 | 142 | 141 |
| | | 46 | 67 | 80 | 66 | 60 | 74 |
| 79 | 5 | 107 | 157 | 152 | 266 | 110 | 73 |
| | | 26 | 52 | 68 | 43 | 54 | 65 |
| 80 | 4 | 73 | 103 | 84 | 200 | 99 | 42 |
| | | 29 | 63 | 80 | 43 | 76 | 60 |
| 81 | 3.5 | 45 | 59 | 78 | 166 | 83 | 28 |
| | | 20 | 73 | 79 | 43 | 80 | 53 |
| 82 | 7 | 215 | 262 | 283 | 283 | 143 | 159 |
| | | 49 | 59 | 83 | 55 | 59 | 73 |
| 83 | 4.5 | 195 | 192 | 202 | 260 | 125 | 108 |
| | | 45 | 64 | 66 | 51 | 58 | 59 |
| 84 | 3.5 | 66 | 93 | 112 | 208 | 92 | 42 |
| | | 23 | 64 | 65 | 29 | 50 | 52 |
| 85 | 3 | 44 | 64 | 96 | 156 | 86 | 27 |
| | | 30 | 74 | 67 | 23 | 67 | 48 |
| 86 | 8 | 239 | 303 | 283 | 308 | 147 | 146 |
| | | 52 | 71 | 94 | 62 | 55 | 88 |
| 87 | 6.5 | 230 | 238 | 238 | 290 | 138 | 141 |
| | | 50 | 70 | 89 | 50 | 55 | 74 |
| 88 | 6 | 211 | 221 | 219 | 386 | 119 | 132 |
| | | 70 | 80 | 84 | 50 | 64 | 93 |
| 89 | 6 | 179 | 166 | 201 | 265 | 110 | 112 |
| | | 55 | 86 | 89 | 47 | 72 | 80 |
| 90 | 5.5 | 157 | 157 | 155 | 260 | 105 | 98 |
| | | 63 | 93 | 96 | 49 | 63 | 96 |

Heat aging studies were performed on Samples Nos. 77–90. More specifically, Sample Nos. 77–90 were applied to ⅜×16 steel nut and bolt assemblies, allowed to cure at ambient temperature conditions for a period of time of about 24 hours and subjected to elevated temperature conditions for a period of time of about 1 to about 6 weeks. The temperatures, durations and break strength and prevailing torque data are set forth below in Tables 22a and 22b. The upper value represents the break strength and the lower value represents the prevailing torque.

TABLE 22a

| Heat Aging (time @ temp.) | Sample No. | | | | | | |
|---|---|---|---|---|---|---|---|
| | 77 | 78 | 79 | 80 | 81 | 82 | 83 |
| 1 week @ 400° F. | 165 | 281 | 158 | 135 | 79 | 260 | 188 |
| | 260 | 162 | 171 | 153 | 98 | 157 | 160 |
| 2 weeks @ 400° F. | 228 | 245 | 67 | 71 | 47 | 225 | 169 |
| | 142 | 155 | 115 | 80 | 76 | 156 | 172 |
| 4 weeks @ 400° F. | 137 | 123 | 51 | 43 | 32 | 108 | 66 |
| | 142 | 151 | 90 | 66 | 54 | 130 | 118 |
| 6 weeks @ 400° F. | 86 | 79 | 35 | 32 | 25 | 69 | 50 |
| | 132 | 125 | 56 | 46 | 37 | 118 | 79 |
| 1 week @ 450° F. | 204 | 158 | 49 | 39 | 37 | 185 | 85 |
| | 140 | 117 | 67 | 61 | 48 | 121 | 105 |
| 4 weeks @ 450° F. | 44 | 23 | 18 | 18 | 18 | 33 | 22 |
| | 48 | 27 | 19 | 17 | 18 | 35 | 23 |
| 6 weeks @ 450° F. | 18 | 12.5 | 5.5 | 5.3 | 5.3 | 13.7 | 7.5 |
| | 20 | 16 | 9 | 7 | 7.2 | 17.3 | 11 |

TABLE 22b

| Heat Aging (time @ temp.) | Sample No. 84 | 85 | 86 | 87 | 88 | 89 | 90 |
|---|---|---|---|---|---|---|---|
| 1 week @ 400° F. | 188 | 108 | 310 | 259 | 270 | 239 | 186 |
|  | 127 | 109 | 176 | 166 | 153 | 144 | 164 |
| 2 weeks @ 400° F. | 79 | 69 | 259 | 232 | 199 | 148 | 112 |
|  | 94 | 74 | 164 | 155 | 160 | 137 | 134 |
| 4 weeks @ 400° F. | 49 | 45 | 149 | 102 | 95 | 75 | 48 |
|  | 70 | 56 | 147 | 127 | 119 | 95 | 79 |
| 6 weeks @ 400° F. | 44 | 38 | 114 | 68 | 58 | 43 | 36 |
|  | 56 | 45 | 139 | 101 | 84 | 76 | 58 |
| 1 week @ 450° F. | 46 | 34 | 163 | 142 | 133 | 100 | 61 |
|  | 56 | 42 | 127 | 103 | 95 | 70 | 60 |
| 4 weeks @ 450° F. | 20 | 18 | 26 | 23 | 24 | 21 | 19 |
|  | 17 | 15 | 28 | 23 | 22 | 21 | 15 |
| 6 weeks @ 450° F. | 6.7 | 5.5 | 13 | 10.7 | 12.2 | 10.7 | 4.2 |
|  | 8.7 | 6.5 | 13 | 11 | 12.7 | 9.8 | 3.5 |

In Table 23 below, cure strength on re-oiled steel in terms of break strength and prevailing torque under ambient temperature conditions at 1 hour, 24 hours and 72 hours, hot strength performance data for certain samples maintained at a temperature of about 500° F. for a period of time of about 2 hours and tested at that temperature, heat aging performance data at elevated temperature conditions of about 400° F. for a period of time of about 1 week and tested at that temperature are provided. The upper value represents break strength and the lower value represents prevailing torque.

TABLE 23

| | Re-oiled Steel | | | | |
|---|---|---|---|---|---|
| Sample | Cure Strength @ RT | | | Hot Str. 2 hrs @ | Heat Aging 1 week |
| No. | 1 hr | 24 hrs | 72 hrs | 500° F. | @ 400° F. |
| 77 | 159 | 162 | 257 | 291 | 235 |
|  | 65 | 129 | 110 | 74 | 211 |
| 78 | 169 | 238 | 273 | — | 256 |
|  | 73 | 121 | 108 |  | 196 |
| 79 | 144 | 188 | 181 | 262 | 221 |
|  | 96 | 123 | 136 | 62 | 189 |
| 80 | 122 | 143 | 126 | — | 176 |
|  | 66 | 121 | 128 |  | 175 |
| 81 | 71 | 120 | 97 | — | 108 |
|  | 48 | 109 | 94 |  | 133 |
| 82 | 210 | 256 | 242 | — | 230 |
|  | 72 | 125 | 108 |  | 198 |
| 83 | 199 | 193 | 217 | 281 | 211 |
|  | 75 | 137 | 120 | 62 | 198 |
| 84 | 111 | 152 | 138 | — | 238 |
|  | 98 | 108 | 100 |  | 159 |
| 85 | 64 | 93 | 99 | — | 187 |
|  | 50 | 108 | 91 |  | 144 |
| 86 | 198 | 223 | 265 | — | 277 |
|  | 65 | 124 | 112 |  | 214 |
| 87 | 237 | 224 | 226 | — | 238 |
|  | 73 | 107 | 132 |  | 210 |
| 88 | 211 | 211 | 208 | — | 245 |
|  | 84 | 113 | 140 |  | 212 |
| 89 | 182 | 192 | 184 | — | 233 |
|  | 70 | 110 | 132 |  | 199 |
| 90 | 141 | 146 | 152 | 223 | 184 |
|  | 108 | 150 | 140 | 50 | 201 |

In Tables 24a and b below, data is presented demostrating the beneficial effect of the poly-hydroxyalkane component on an anaerobic adhesive formulation to enhance the ability to bond re-oiled substrate surfaces.

More specifically, in this example, steel fastener assemblies were degreased and re-oiled as described above in Example II(B). Cure strength data at ambient temperature conditions for periods of time of about 1 hour, about 24 hours and about 72 hours are set forth in Table 24a for the samples on which re-oiled and degreased substrates are compared relative to steel fastener assemblies without such treatment. Table 24b sets forth data for hot strength and heat aging, comparing such degreased and re-oiled steel fasteners relative to steel fasteners which have not been subjected to such treatment. In Tables 24a and b, the upper value represents break strength and the lower value represents prevailing torque.

TABLE 24a

| | Ratio on Re-oiled/Degreased Steel Fasteners [%] | | |
|---|---|---|---|
| Sample No. | Cure Str. 1 hr @ RT | Cure Str. @ RT 24 hrs | 72 hrs |
| 77 | 81 | 50 | 86 |
|  | 167 | 163 | 126 |
| 78 | 88 | 90 | 103 |
|  | 159 | 181 | 135 |
| 79 | 135 | 120 | 119 |
|  | 369 | 237 | 200 |
| 80 | 167 | 139 | 150 |
|  | 228 | 192 | 160 |
| 81 | 158 | 203 | 124 |
|  | 240 | 149 | 119 |
| 82 | 98 | 98 | 86 |
|  | 147 | 212 | 130 |
| 83 | 102 | 101 | 107 |
|  | 167 | 214 | 182 |
| 84 | 168 | 163 | 123 |
|  | 426 | 169 | 153 |
| 85 | 145 | 145 | 103 |
|  | 167 | 146 | 136 |
| 86 | 83 | 74 | 94 |
|  | 125 | 175 | 119 |
| 87 | 103 | 94 | 95 |
|  | 146 | 153 | 148 |
| 88 | 100 | 95 | 95 |
|  | 120 | 141 | 167 |
| 89 | 102 | 116 | 92 |
|  | 127 | 128 | 148 |
| 90 | 90 | 93 | 98 |
|  | 171 | 161 | 146 |

TABLE 24b

| | Degreased Steel Fasteners [%] | |
|---|---|---|
| Sample No. | Hot Str. 2 hr @ 500° F. | Heat Aging 1 week @ 400° F. |
| 77 | 92 | 90 |
|  | 107 | 128 |
| 78 | — | 91 |
|  |  | 121 |
| 79 | 98 | 140 |
|  | 144 | 111 |
| 80 | — | 130 |
|  |  | 114 |
| 81 | — | 136 |
|  |  | 136 |
| 82 | — | 88 |
|  |  | 126 |
| 83 | 108 | 112 |
|  | 122 | 124 |
| 84 | — | 127 |
|  |  | 125 |

TABLE 24b-continued

| | Degreased Steel Fasteners [%] | |
|---|---|---|
| Sample No. | Hot Str. 2 hr @ 500° F. | Heat Aging 1 week @ 400 ° F. |
| 85 | — | 173 |
| | | 132 |
| 86 | — | 89 |
| | | 122 |
| 87 | — | 92 |
| | | 127 |
| 88 | — | 91 |
| | | 139 |
| 89 | — | 97 |
| | | 138 |
| 90 | 86 | 99 |
| | 102 | 123 |

The upper value represents break strength and the lower value represents prevailing torque.

V. Polymeric Plasticizer Effect on Silicon-based Anaerobic Adhesives

A desirable medium strength formulation according to this invention provides the following components in the recited amounts: SiMA (40.2%), HPMA (10%), EBIPMA (5%), HVA-2 (10%), "UNIFLEX" 300 polymeric plasticizer (20%), DTPA chelator (0.7%), with the remaining 14.1% by weight made up of fillers and the anaerobic cure-inducing composition (Sample No. 91).

The fixture time, cure strength, hot strength and heat aging results on degreased steel fastener assemblies were measured and are present below in Table 25a. The cure strength on re-oiled steel, zinc and stainless steel fastener assemblies were also measured, data for those results are set forth below in Table 25b. Here again the upper value represents break strength and the lower value represents torque.

TABLE 25a

| | | Degreased Steel | | | | |
|---|---|---|---|---|---|---|
| Sample No. | Fixture Time (mins) | Cure Strength @ RT | | | Hot Str. 2 hrs @ 500° F. | Heat Aging 1 week @ 400° F. |
| | | 1 hr | 24 hrs | 72 hrs | | |
| 91 | 14 | 61 | 164 | 178 | 90 | 274 |
| | | 33 | 46 | 54 | 21 | 101 |

TABLE 25b

| | Cure Strength @ RT | | | | | | |
|---|---|---|---|---|---|---|---|
| Sample No. | Re-oiled Steel | | | Zinc | | Stainless Steel | |
| | 1 hr | 24 hrs | 72 hrs | 24 hrs | 72 hrs | 24 hrs | 72 hrs |
| 91 | 49 | 174 | 190 | 160 | 183 | 123 | 138 |
| | 29 | 47 | 51 | 40 | 43 | 30 | 31 |

Depending on the particular application for which the anaerobic adhesive composition is destined, different break strengths and prevailing torque values may be considered acceptable to accomplish the goal at hand. For many applications, break strength is an important parameter because once a fastener (e.g, a nut from a nut and bolt assembly) turns, the clamping force is effectively lost. The prevailing torque value, on the other hand, is a measure of the effort required to disassemble the fastener, and informs the user of when the fastener will come apart.

For certain applications, a high break strength value is particularly desirable. Examples of those such an anaerobic adhesive composition is to be used. For other applications, a lower break strength is desirable. Examples of such other applications include removable threadlockers where the machine is desirably maintained at regular intervals. Thus, it is seen that commercially-acceptable anaerobic adhesive compositions will have different break strength and prevailing torque values depending on the use to which that composition is placed.

With respect to controlled strength anaerobic adhesive compositions, desirable applications include those where the fastener assemblies are small such that the strength of the bond formed by the cured adhesive does not exceed the proof load of the assembly. In this way, the integrity of the fastener assembly is maintained without the occurrence of breaking, traditional twisting or stretching which could occur with a high strength anaerobic adhesive.

These examples are provided solely for illustrative purposes, and are in no way intended to limit the spirit and scope of the invention as defined by the claims.

What is claimed is:

1. An anaerobic adhesive composition, reaction products of which demonstrate controlled strength at ambient temperature conditions and enhanced resistance to thermal degradation at elevated temperature conditions, comprising:

(a) a (meth)acrylate component;

(b) a maleimide component;

(c) a diluent component reactive at elevated temperature conditions; and (d) an anaerobic cure-inducing component.

2. An anaerobic adhesive composition, reaction products of which demonstrate resistance to thermal degradation at elevated temperatures, comprising:

(a) a (meth)acrylate component;

(b) a coreactant component selected from the group consisting of materials within the structures represented by:

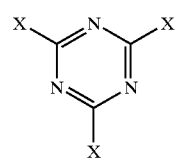

I

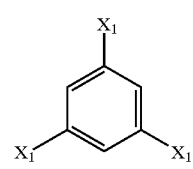

II wherein X is present at least once on structure I and is a member selected from the group consisting of H and DA, where D is attached to the ring and is a member selected from the group consisting of O, S and NH and A is attached to D and is represented by structure III:

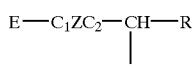

wherein Z represents (1) a double bond with at least one H attached to $C_1$ and an H or halogen attached to $C_2$, or (2) a triple bond; and E is a member selected from the group consisting of H; and alkyl, alkenyl, alkynyl, alkoxy, each of which may be linear, branched or cyclic, or aryl groups, having from 1 to about 20 carbon atoms, with or without substitution by halogen, silicon, hydroxy, nitrile, ester, amide or sulfate, provided that additional point(s) of unsaturation or heteroatoms, if any, in the groups represented by R are not alpha to Z;

R may be H; and alkyl, alkenyl, alkynyl, alkoxy, each of which may be linear, branched or cyclic, or aryl groups, having from 1 to about 20 carbon atoms, with or without substitution by a member selected from the group consisting of halogen, hydroxy, nitrile, ester, amide and sulfate; and $X_1$ is present at least once on structure II and is a member selected from the group consisting of H and

wherein D and A are as recited above;

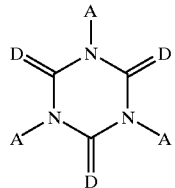

wherein D and A are as recited above;

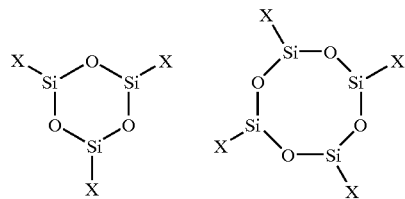

wherein X is as recited above; and

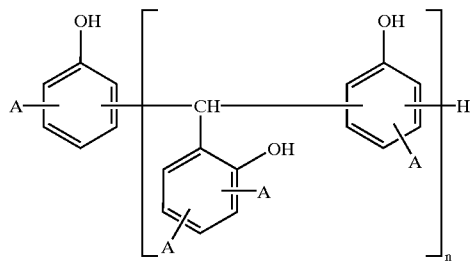

wherein A is as recited above and
n is from 0 to about 5; and (c) an anaerobic cure-inducing component.

3. An anaerobically curing composition, comprising:

(a) a silicone fluid formed as the reaction product of at least one first silane of the formula, $R_nSi(X)_{4-n}$, wherein the R groups may be the same or different and selected from the group consisting of hydrogen, $C_1$–$C_{12}$ alkyl, $C_6$–$C_{12}$ aryl, $C_7$–$C_{18}$ arylalkyl, $C_7$–$C_{18}$ alkylaryl, haloalkyl, haloaryl and monovalent ethylenically unsaturated radicals excluding (meth)acryloxy functional groups, X is a hydrolyzable functionality, and n is an integer of from 0 to 3, and at least one second silane of the formula, $R^1_m R^2_p Si(X)_{4-(m+p)}$, wherein $R^1$ is a (meth)acrylic functional group and $R^2$ may be the same or different and is a member selected from the group consisting of monovalent ethylenically unsaturated radicals, hydrogen, $C_1$–$C_{12}$ alkyl, $C_6$–$C_{12}$ aryl, $C_7$–$C_{18}$ arylalkyl, and $C_7$–$C_{18}$ alkylaryl, X is a hydrolyzable functionality, m is an integer from 1 to 3, and m+p is an integer from 1 to 3;

(b) a (meth)acrylate component;

a component selected from the group consisting of maleimide components, mono- or poly-hydroxy-components, and combinations thereof and (d) an anaerobic cure-inducing component.

4. An anaerobically curing composition, comprising:

(a) a silicone fluid formed as the reaction product of at least one first silane of the formula, $R_nSi(X)_{4-n}$, wherein the R groups may be the same or different and selected from the group consisting of hydrogen, $C_1$–$C_{12}$ alkyl, $C_6$–$C_{12}$ aryl, $C_7$–$C_{18}$ arylalkyl, $C_7$–$C_{18}$ alkylaryl, haloalkyl, haloaryl and monovalent ethylenically unsaturated radicals excluding (meth)acryloxy functional groups, X is a hydrolyzable functionality, and n is an integer of from 0 to 3, and at least one second silane of the formula, $R^1_m R^2_p Si(X)_{4-(m+p)}$, wherein $R^1$ is a (meth)acrylic functional group and $R^2$ may be the same or different and is a member selected from the group consisting of monovalent ethylenically unsaturated radicals, hydrogen, $C_1$–$C_{12}$ alkyl, $C_6$–$C_{12}$ aryl, $C_7$–$C_{18}$ arylalkyl, and $C_7$–$C_{18}$ alkylaryl, X is a hydrolyzable functionality, m is an integer from 1 to 3, and m+p is an integer from 1 to 3;

(b) a plasticizer component; and (c) an anaerobic cure-inducing composition.

5. The composition according to claim 4, further comprising a (meth)acrylate component.

6. The composition according to any one of claims 1–2, 3 or 5, wherein the (meth)acrylate component is represented by $H_2C=CGCO_2R_1$, wherein G is a member selected from the group consisting of H, halogen and alkyl having from 1 to about four carbon atoms, and $R_1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulonate and sulfone.

7. The composition according to claim 6, wherein the (meth)acrylate component is a member selected from the group consisting of silicone (meth)acrylate moieties, polyethylene glycol di(meth)acrylates, bisphenol-A-(meth)acrylates, ethoxylated bisphenol-A-(meth)acrylates, tetrahydrofuran (meth)acrylates and di(meth)acrylates, hydroxypropyl (meth)acrylate, hexanediol di(meth)acrylate, trimethylol propane tri(meth)acrylate, and an acrylate ester corresponding to the structure shown below:

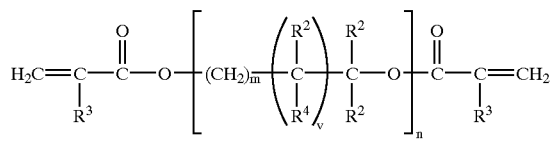

wherein $R^2$ may be selected from the group consisting of hydrogen, alkyl of 1 to about 4 carbon atoms, hydroxyalkyl of 1 to about 4 carbon atoms and

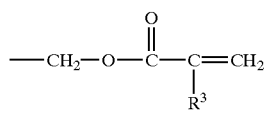

$R^3$ may be selected from the group consisting of hydrogen, halogen, and alkyl of 1 to about 4 carbon atoms;

$R^4$ may be selected from the group consisting of hydrogen, hydroxy and

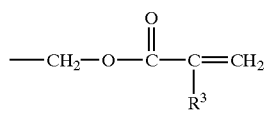

m is at least 1;

v is 0 or 1; and n is at least 1;

and combinations thereof.

8. The composition according to any one of claim 1 or 3, wherein the maleimide component is represented by a member selected from the group consisting of

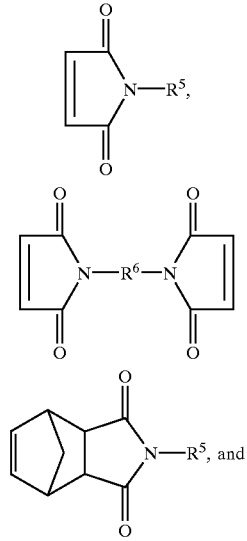

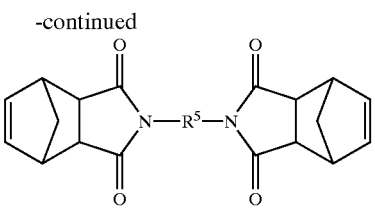

wherein $R^5$ and $R^6$ are each members selected from the group consisting of alkyl, aryl, aralkyl and alkaryl groups, having from about 6 to about 100 carbon atoms, with or without substitution or interruption by a member selected from the group consisting of silane, silicon, oxygen, halogen, carbonyl, hydroxyl, ester, carboxylic acid, urea, urethane, carbamate, sulfur, sulfinate and sulfone.

9. The composition according to claim 8, wherein the maleimide component is:

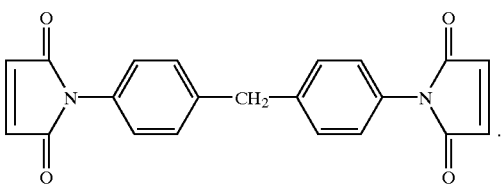

10. The composition according to claim 8, wherein the maleimide component is:

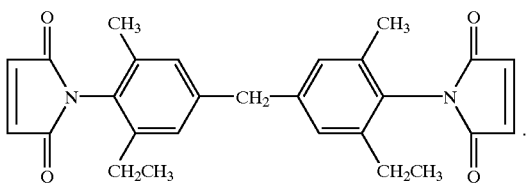

11. The composition according to claim 8, wherein the maleimide component is:

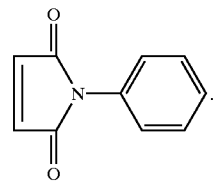

12. The composition according to claim 1, wherein the reactive diluent component is a member selected from the group consisting of alkenyl-terminated silicone fluids, alkynyl-terminated silicone fluids, alkenyl-terminated MQ resins, alkynyl-terminated MQ resins, alkenyl-terminated cyclosiloxanes, alkynyl-terminated cyclosiloxanes, and combinations thereof.

13. The composition according to claim 1, wherein the reactive diluent component is a member selected from the group consisting of vinyl-terminated polydimethlylsiloxane, vinyl-terminated MQ resin, 2,4,6-trimethyl-2,4,6-trivinyl-cyclotrisiloxane, 2,4,6,8-tetramethyl-2,4,6,8-tetravinyl-cyclotetrasiloxane, and combinations thereof.

14. The composition according to claim 1, wherein the reactive diluent comprises vinyl-terminated polydimethylsiloxane.

15. The composition according to claim 2, wherein the coreactant component is a member selected from the group consisting of materials within the structures represented by:

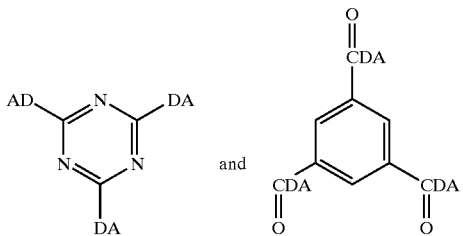

and wherein D is a member selected from the group consisting of O, S and NH and A is represented by structure III:

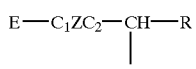

wherein

Z represents (1) a double bond with at least one H attached to $C_1$ and an H or halogen attached to $C_2$, or (2) a triple bond;

E is a member selected from the group consisting of H; and alkyl, alkenyl, alkynyl, alkoxy, each of which may be linear, branched or cyclic, or aryl groups, having from 1 to about 20 carbon atoms, with or without substitution by a member selected from the group consisting of halogen, silicon, hydroxy, nitrile, ester, amide and sulfate, provided that additional point(s) of unsaturation or heteroatoms, if any, in the groups represented by R are not alpha to Z; and R is a member selected from the group consisting of H, or linear, branched or cyclic alkyl, alkenyl, alkynyl, alkoxy, or aryl groups having from 1 to about 20 carbon atoms, with or without substitution by a member selected from the group consisting of halogen, silicon, hydroxy, nitrile, ester, amiede and sulfate.

16. The composition according to claim 15, wherein the coreactant component is represented by

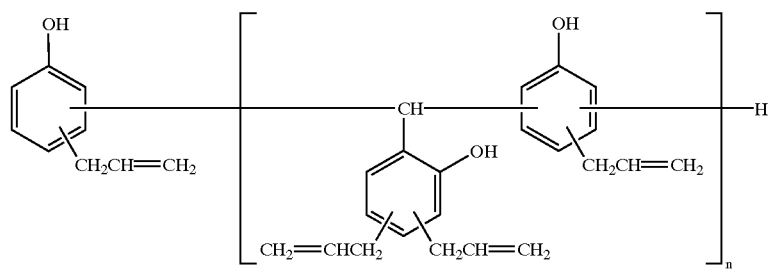

wherein n is 0 to about 5.

17. The composition according to claim 15, wherein the coreactant is:

18. The composition according to claim 15, wherein the coreactant is:

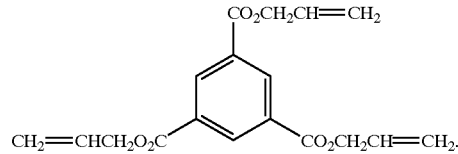

19. The composition according to claim 15, wherein the coreactant is:

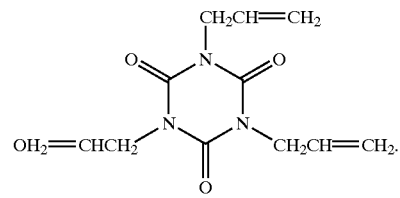

20. The composition according to any one of claims 1–2, 3 or 4, further comprising a member selected from the group consisting of mono-hydroxyalkanes and poly-hydroxyalklanes.

21. The composition according to claim 20, wherein the poly-hydroxyalkane may be selected from the group consisting of ethylene glycol, propylene glycols, propane triols, butylene glycols, butane triols, butane tetraols, butane pentaols, pentylene glycols, pentane triols, pentane tetraols, pentane pentols, pentane hexaols, hexylene glycols, hexane triols, hexane tetraols, hexane pentaols, hexane hexaols, hexane heptaols and combinations thereof.

22. The composition according to any one of claims 1–2, 3 or 4, wherein the anaerobic cure-inducing composition comprises saccharin, toluidenes, acetyl phenylhydrazine, maleic acid and cumene hydroperoxide.

23. The composition according to any one of claims 1–2, 3 or 4, further comprising a plasticizer component.

24. The composition according to claim 23, wherein the plasticizer is a polymeric plasticizer.

25. The composition according to claim 24, wherein the polymeric plasticizer is resistant to high temperatures, and is made from hexanedioic acid and polymer with 1,4-butane diol and 1,2-propane diol, with a viscosity at 25° C. of 3300 cps.

26. The composition according to any one of claim 3 or 4, wherein said at least one second silane is present in an amount within the range of from about 1 to about 99 mole % of the total of said at least one first silane and said at least one second silane.

27. The composition according to claim 26, wherein said at least one second silane is present in an amount within the range of from about 20 to about 50 mole % of the total of said at least one first and said at least one second silane.

28. The composition according to any one of claim 3 or 4, wherein the silicone fluid is present in an amount within the range of from about 40 to about 95 percent by weight of the composition.

29. The composition according to claim 28, wherein the silicone fluid is present in an amount within the range of from about 60 to about 85 percent by weight of the composition.

30. The composition according to any one of claims 1–2 or 3, wherein the (meth)acrylate component is present in an amount within the range of from about 1 to about 60 percent by weight of the composition.

31. The composition according to claim 30, wherein the (meth)acrylate component is present in an amount within the range of from about 10 to about 40 percent by weight of the composition.

32. The composition according to any one of claim 1 or 3, wherein the maleimide component is present in an amount within the range of from about 5 to about 20 percent by weight of the composition.

33. The composition according to claim 32, wherein the maleimide component is present in an amount within the range of from about 10 to about15 percent by weight of the composition.

34. A reaction product formed from the composition according to any one of claims 1–2, 3, and 4–33 upon exposure to conditions selected from the group consisting of those in which air is substantially excluded therefrom ambient temperature, elevated temperature, and combinations thereof.

35. A reaction product formed from the composition according to any one of claims 1–33, after curing at ambient temperature conditions.

36. The composition according to claim 1, wherein the (meth)acrylate component (a) comprises the combination of silicone methacrylate, hydroxypropyl methacrylate, and ethoxylated bisphenol-A-dimethacrylate; the maleimide component (b) comprises N,N'-m-phenylene bismaleimide; the reactive diluent component (c) comprises vinyl-terminated polydimethysiloxane; and the anaerobic cure-inducing composition (d) comprises the combination of acetyl phenylhydrazine, maleic acid, saccharin, N,N-diethyl-p-toluidine, N,N-dimethyl-o-toluidine and cumene hydroperoxide.

37. The composition according to claim 36, wherein the (meth)acrylate component (a) comprises the combination of polyethylene glycol methacrylate and ethoxylated bisphenol-A-dimethacrylate; the coreactant (b) comprises triallyl cyanurate; the maleimide component (c) comprises the combination of a bismaleimide and N-phenylmaleimide; and the anaerobic cure-inducing composition (d) comprises the combination of acetyl phenylhydrazine, maleic acid, saccharin, N,N-diethyl-p-toluidine, N,N-dimethyl-o-toluidine and cumene hydroperoxide.

38. An anaerobically curing composition, comprising:

(a) a silicone fluid formed as the reaction product of at least one first silane of the formula, $R_nSi(X)_{4-n}$, wherein the R groups may be the same or different and selected from the group consisting of hydrogen, $C_1$–$C_{12}$ alkyl, $C_6$–$C_{12}$ aryl, $C_7$–$C_{18}$ arylalkyl, $C_7$–$C_{18}$ alkylaryl, haloalkyl, haloaryl and monovalent ethylenically unsaturated radicals excluding (meth)acryloxy functional groups, X is a hydrolyzable functionality, and n is an integer of from 0 to 3, and at least one second silane of the formula, $R^1_m R^2_p Si(X)_{4-(m+p)}$; wherein $R^1$ is a (meth)acrylic functional group and $R^2$ may be the same or different and is a member selected from the group consisting of monovalent ethylenically unsaturated radicals, hydrogen, $C_1$–$C_{12}$ alkyl, $C_6$–$C_{12}$ aryl, $C_7$–$C_{18}$ arylalkyl, and $C_7$–$C_{18}$ alkylaryl, X is a hydrolyzable functionality, m is an integer from 1 to 3, and m+p is an integer from 1 to 3;

(b) a maleimide component; and (c) an anaerobic cure-inducing component.

* * * * *